US006541754B2

(12) United States Patent
Matsuyama

(10) Patent No.: US 6,541,754 B2
(45) Date of Patent: Apr. 1, 2003

(54) METHOD AND APPARATUS FOR MEASURING PHOTOELECTRIC CONVERSION CHARACTERISTICS OF PHOTOELECTRIC CONVERSION DEVICE

(75) Inventor: Jinsho Matsuyama, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 09/893,640

(22) Filed: Jun. 29, 2001

(65) Prior Publication Data

US 2002/0030153 A1 Mar. 14, 2002

(30) Foreign Application Priority Data

Jul. 5, 2000 (JP) ........................ 2000-203274

(51) Int. Cl.[7] .................... G06F 15/12; H01L 31/00
(52) U.S. Cl. .................... 250/214.1; 235/454; 235/455
(58) Field of Search .................... 235/454, 455; 250/214.1, 201.8, 559.03, 252.1, 564, 585, 801.6, 208.2; 438/482, 95, 485; 324/96

(56) References Cited

U.S. PATENT DOCUMENTS

| 4,788,569 | A | * | 11/1988 | Yamada et al. | .............. 396/147 |
|---|---|---|---|---|---|
| 5,473,403 | A | * | 12/1995 | Suda et al. | .................. 396/121 |
| 5,527,391 | A | * | 6/1996 | Echizen et al. | .............. 118/719 |
| 5,804,466 | A | * | 9/1998 | Arao et al. | .................... 438/95 |
| 6,252,158 | B1 | * | 6/2001 | Higashikawa | ............... 136/258 |
| 6,383,898 | B1 | * | 5/2002 | Kishimoto | ................... 438/482 |
| 2002/0014886 | A1 | * | 2/2002 | Matsuyama | ................... 324/96 |

OTHER PUBLICATIONS

T. Glatfelter, et al., "A Method for Determining the Conversion Efficiency of Multiple–Cell Photovoltaic Devices", 19th IEEE Photovoltaic Spec. Conf., pp. 1187–1193 (1987).

* cited by examiner

Primary Examiner—Thien M. Le
(74) Attorney, Agent, or Firm—Fitzpatrick, Cella, Harper & Scinto

(57) ABSTRACT

To provide a measuring method capable of measuring even a large-area stacked photoelectric conversion device such as a module or array either indoors or outdoors and accurately measuring the photoelectric conversion characteristics using an inexpensive measuring system, the photoelectric conversion characteristics of a photoelectric conversion device under irradiation light in a plurality of spectral states and a shift of the short-circuit current of each component cell of the photoelectric conversion device from the standard test condition are estimated, and the measured photoelectric conversion characteristics and the estimated shift are compared, thereby obtaining the photoelectric conversion characteristics of the photoelectric conversion device in the standard test conditions.

21 Claims, 15 Drawing Sheets

FIG. 8

| SMALL SAMPLE | #1-1 | #1-2 | #1-3 |
|---|---|---|---|
| SHORT-CIRCUIT CURRENT OF TOP CELL (mA/cm$^2$) | 6.8 | 7.1 | 7.1 |
| SHORT-CIRCUIT CURRENT OF MIDDLE CELL (mA/cm$^2$) | 7.2 | 6.9 | 7.3 |
| SHORT-CIRCUIT CURRENT OF BOTTOM CELL (mA/cm$^2$) | 7.4 | 7.3 | 6.8 |

FIG. 9

| SAMPLE | #1-1 | #1-2 | #1-3 |
|---|---|---|---|
| $\eta$ (%) | 8.027 | 8.022 | 7.966 |
| Voc (V) | 10.058 | 10.048 | 10.027 |
| Isc (A) | 5.422 | 5.466 | 5.504 |
| FF | 0.5933 | 0.5889 | 0.5820 |

FIG. 10

| SAMPLE | #1-1 | #1-2 | #1-3 |
|---|---|---|---|
| $\eta$ (%) | 8.04 | 8.00 | 7.93 |
| Voc (V) | 10.06 | 10.04 | 10.03 |
| Isc (A) | 5.44 | 5.44 | 5.47 |
| FF | 0.592 | 0.591 | 0.583 |

FIG. 11

| SAMPLE | #1-1 | #1-2 | #1-3 |
|---|---|---|---|
| ERROR IN $\eta$ | −0.2% | 0.3% | 0.5% |
| ERROR IN Voc | 0.0% | 0.1% | 0.0% |
| ERROR IN Isc | −0.3% | 0.5% | 0.6% |
| ERROR IN FF | 0.2% | −0.3% | −0.1% |

FIG. 12

| SAMPLE | EXAMPLE 2 |
|---|---|
| Pmax (W) | 70.6 |
| Voc (V) | 22.5 |
| Isc (A) | 4.22 |
| FF | 0.744 |

FIG. 13

| SAMPLE | #3-1 | #3-2 | #3-3 | #3-4 | #3-5 | #3-6 | #3-7 | #3-8 | #3-9 | #3-10 |
|---|---|---|---|---|---|---|---|---|---|---|
| η (%) | 12.5 | 12.5 | 12.5 | 12.4 | 12.5 | 12.6 | 12.6 | 12.6 | 12.5 | 12.4 |
| Voc (V) | 1.45 | 1.46 | 1.44 | 1.44 | 1.45 | 1.46 | 1.44 | 1.45 | 1.45 | 1.45 |
| Isc (A) | 2.52 | 2.50 | 2.54 | 2.55 | 2.53 | 2.48 | 2.56 | 2.49 | 2.51 | 2.47 |
| FF | 0.720 | 0.722 | 0.715 | 0.712 | 0.718 | 0.728 | 0.716 | 0.730 | 0.721 | 0.729 |

FIG. 14

| SAMPLE | EXAMPLE 4 |
|---|---|
| Pmax (kW) | 3.32 |
| Voc (V) | 202.8 |
| Isc (A) | 27.2 |
| FF | 0.602 |

FIG. 15

| SAMPLE | #5-1 | #5-2 | #5-3 | #5-4 | #5-5 |
|---|---|---|---|---|---|
| $\eta$ (%) | 16.9 | 17.3 | 16.7 | 17.2 | 16.9 |
| Voc (V) | 2.01 | 2.02 | 2.00 | 2.03 | 2.02 |
| Isc (mA) | 12.0 | 12.3 | 11.7 | 12.2 | 11.9 |
| FF | 0.701 | 0.695 | 0.715 | 0.693 | 0.703 |

METHOD AND APPARATUS FOR MEASURING PHOTOELECTRIC CONVERSION CHARACTERISTICS OF PHOTOELECTRIC CONVERSION DEVICE

FIELD OF THE INVENTION

The present invention relates to a method and apparatus for measuring photoelectric conversion characteristics and, more particularly, to a method and apparatus for measuring the photoelectric conversion characteristics of a photoelectric conversion device such as a solar cell, photodiode, photosensor, or electrophotographic photosensitive body and, especially, a stacked photoelectric conversion device.

BACKGROUND OF THE INVENTION

In a stacked photoelectric conversion device in which a plurality of photoelectric conversion elements with different spectral responses are stacked, long-wavelength light that cannot be completely absorbed by the upper photoelectric conversion element on the light incident side is absorbed by the lower photoelectric conversion element, thereby increasing the output or sensitivity. Hence, such stacked photoelectric conversion devices have been extensively developed.

It is very important to accurately measure the output characteristics of a stacked photoelectric conversion device due to the following reasons.

For example, in manufacturing and delivering stacked photoelectric conversion devices whose maximum power is important, a photoelectric conversion device whose maximum power is less than a rated value is determined as a defective product by inspection. However, the maximum power of a photoelectric conversion device to be delivered cannot be guaranteed unless the output can be accurately measured. In addition, if an output measurement error is large, and the measurement error changes depending on the state of the measuring apparatus, the inspection threshold value varies even for photoelectric conversion devices with the same quality, resulting in unstable manufacturing yield. Furthermore, if the inspection threshold value contains a measurement error value to guarantee the quality of photoelectric conversion devices to be delivered, the manufacturing yield inevitably decreases.

If the output of a stacked photoelectric conversion device cannot be accurately predicted, no predicted system characteristic can be obtained or the system efficiency degrades in building a system using the stacked photoelectric conversion device. When the stacked photoelectric conversion device is a solar cell, it considerably affects, e.g., the guaranteed maximum power of the solar cell, manufacturing yield, power generation prediction of a power generation system, and system efficiency.

However, it is very difficult to accurately measure the output characteristics of a stacked photoelectric conversion device. The main reason for this is that the output characteristics of the stacked photoelectric conversion device largely change depending on the spectrum of irradiation light. For example, a double-type solar cell (to be referred to as a "double cell" hereinafter) in which two semiconductor junctions are stacked and connected in series will be described in detail. The upper semiconductor junction on the light incident side is called a top cell, and the lower semiconductor junction is called a bottom cell. The short-circuit current of each cell changes depending on the spectrum of irradiation light because the cells have different spectral responses. As a result, the short-circuit current, fill factor, and open-circuit voltage of the entire double cell change, and the output characteristics of the double cell largely change.

To the contrary, in a single-type cell (to be referred to as a "single cell" hereinafter) having a single semiconductor junction, only the short-circuit current changes depending on the spectrum of irradiation light, and the fill factor and open-circuit voltage are rarely affected. For this reason, when the spectrum dependence of the short-circuit current is corrected, the output characteristics can be almost accurately measured.

Generally, to accurately measure the output characteristics of a photoelectric conversion device, test conditions such as the intensity and spectrum of irradiation light and the temperature of the photoelectric conversion device must be defined. For, e.g., a solar cell, the test conditions are defined as standard test conditions as follows.

Temperature of solar cell: 25° C.
Spectrum of irradiation light: standard sunlight (The spectrum of standard sunlight is defined by JIS C 8911)
Irradiance of irradiation light: 1,000 W/m²

However, of these standard test conditions, the spectrum of standard sunlight can hardly be obtained even when outdoor sunlight is used. This is because the standard sunlight is obtained only under limited meteorological conditions. It is impossible to obtain the spectrum of standard sunlight using a pseudo sunlight source indoors.

For a single cell, pseudo sunlight sources (solar simulators) are classified into ranks A, B, and C sequentially from one close to the standard sunlight on the basis of the spectrum, variation (to be referred to as a "positional variation" hereinafter) in irradiance depending on the position, and time variation ratio. This ranking is described by JIS C 8912 and JIS C 8933. Using a solar simulator of rank A or B and a secondary reference solar cell having a spectral response similar to that of a solar cell to be measured, the irradiance of the solar simulator is set, thereby correcting an error due to a shift in spectrum. This measuring method is described by JIS C 8913 and JIS C 8934.

The above measuring method is possible for a single cell for which the spectrum affects almost only the short-circuit current. However, in a stacked solar cell, the spectrum affects not only the short-circuit current but also the fill factor and open-circuit voltage, as described above, and the output characteristics cannot be accurately measured by the above measuring method. Hence, the stacked solar cell is excluded from the above-described JIS.

The following technique has been proposed as a method of accurately measuring the output characteristics of a stacked solar cell.

The spectrum of a solar simulator used to measure a stacked solar cell is made adjustable and adjusted to obtain short-circuit current and fill factor values that the stacked solar cell probably generates under standard sunlight, thereby accurately measuring the output characteristics (this technique will be referred to as a "multi-source method" hereinafter) (T. Glatfelter and J. Burdick, 19th IEEE Photovoltaic Specialists Conference, 1987, pp. 1187–1193).

That is, each of a plurality of semiconductor junctions of a stacked solar cell is defined as a component cell. Let In.ref (n is the number of each component cell) be the short-circuit current generated by each component cell in the stacked solar cell under standard sunlight and In.test be the short-circuit current generated under a solar simulator. Then, when the spectrum of the solar simulator is adjusted to satisfy $$In.test = In.ref \tag{1}$$

for each component cell, the short-circuit current and fill factor of the stacked solar cell match the values under the standard sunlight.

The above measurement technique assumes use of a solar simulator having an adjustable spectrum. In the above-described reference, to adjust the short-circuit current of each component cell, light components from three light sources: one xenon (Xe) lamp and two halogen lamps are separated into three wavelength bands and then synthesized. By adjusting the irradiances of the three light sources, the intensities of light components in the three wavelength bands are controlled, thereby adjusting the spectrum of the synthesized light.

The solar simulator with variable spectrum is possible for a small irradiation area of 400 cm$^2$ or less. However, due to the following reasons, it is very difficult to manufacture a solar simulator having an area more than 400 cm$^2$.

(i) Since a plurality of light components having different spectra are synthesized, the positional variations in spectrum of the synthesized light and in irradiance become large. The larger the irradiation area is, the more serious these variations become.

(ii) Since the spectrum of partial light from the light source is used, the light intensity tends to be short. When the irradiation area becomes large, it is hard to obtain an irradiance of the standard test condition of 1,000 W/m$^2$.

(iii) The structure becomes complex, and the manufacturing cost largely increases as compared to a normal solar simulator using a single light source.

(iv) Adjustment of the solar simulator with variable spectrum is cumbersome, and its control requires skill.

The multi-source method can accurately measure the output characteristics of a stacked solar cell. However, due to the above reasons, the light-receiving area of the solar cell to be measured is limited to the minimal area of laboratory level, and it is hard to measure a cell, module, or array having an area more than 400 cm$^2$. Even when a measuring apparatus for the multi-source method can be manufactured, the cost is very high.

In addition, the multi-source method cannot be applied to outdoor measurement using sunlight. However, to, e.g., check the output of a solar power generation system, it is necessary to measure a stacked photoelectric conversion device installed outdoors using sunlight. In measuring the output characteristics of the stacked photoelectric conversion device, no accurate measurement result can be obtained unless a change in output characteristics of the stacked photoelectric conversion device due to a change in sunlight spectrum is corrected. This correction is a problem kept unsolved. Furthermore, in predicting the power generation amount of a stacked photoelectric conversion device outdoors in accordance with the region or season, it is important for accurate power generation amount prediction to take into consideration the change in output characteristics of the stacked photoelectric conversion device due to the change in sunlight spectrum.

However, the change in sunlight spectrum is not uniform. Additionally, the change in sunlight spectrum is represented using a number of indices including the air mass, turbidity, and precipitable water as main indices that have large influence. The manner the output characteristics of the stacked photoelectric conversion device change differs for each index. Hence, it is very difficult to calculate or correct the change in output characteristics of the stacked photoelectric conversion device due to the change in sunlight spectrum.

SUMMARY OF THE INVENTION

The present invention has been made to solve the above-described problems individually or altogether, and has as its object to measure the photoelectric conversion characteristics of a wide-area photoelectric conversion device such as a module or array independently of the area of a stacked photoelectric conversion device to be measured.

It is another object of the present invention to accurately measure the photoelectric conversion characteristics of a stacked photoelectric conversion device using an inexpensive measuring system.

In order to achieve the above objects, according to a preferred aspect of the present invention, a method of measuring photoelectric conversion characteristics of a stacked photoelectric conversion device having a structure in which a plurality of semiconductor junctions are stacked, comprising the steps of measuring output characteristics of the photoelectric conversion device under irradiation light having a plurality of different spectral states, estimating a shift, from a standard test condition, of a short-circuit current of a component cell formed by each of the plurality of semiconductor junctions of the photoelectric conversion device, and obtaining the photoelectric conversion characteristics of the photoelectric conversion device in the standard test condition by comparing the measured photoelectric conversion characteristics with the estimated shift of the short-circuit current from the standard test condition is disclosed.

It is still another object of the present invention to measure the photoelectric conversion characteristics of a stacked photoelectric conversion device both indoors and outdoors.

In order to achieve the above object, according to a preferred aspect of the present invention, the method wherein the plurality of different spectral states are realized by using pseudo sunlight as the irradiation light and changing or exchanging some components of an optical system for irradiation is disclosed.

It is still another object of the present invention to quantify the spectrum dependence of the photoelectric conversion characteristics of a stacked photoelectric conversion device.

In order to achieve the above object, according to a preferred aspect of the present invention, a method of quantifying spectrum dependence comprising the step of representing a change in spectrum of the irradiation light as an index on the basis of a change in shift of the short-circuit current of the component cell from the standard test condition and quantifying the spectrum dependence of the photoelectric conversion characteristics of the photoelectric conversion device is disclosed.

It is still another object of the present invention to predict the output characteristics of a stacked photoelectric conversion device.

In order to achieve the above object, according to a preferred aspect of the present invention, a method of predicting photoelectric conversion characteristics of a photoelectric conversion device comprising the step of predicting the photoelectric conversion characteristics of the photoelectric conversion device in an arbitrary spectral state on the basis of a change in shift of the short-circuit current of the component cell from the standard test condition is disclosed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a table showing the calculation results of short-circuit currents in Example 1;

FIG. 9 is a table showing the measurement results in Example 1;

FIG. 10 is a table showing the measurement results in Comparative Example 1;

FIG. 11 is a table showing comparison between Example 1 and Comparative Example 1;

FIG. 12 is a table showing the measurement results in Example 2;

FIG. 13 is a table showing the measurement results in Example 3;

FIG. 14 is a table showing the measurement results in Example 4; and

FIG. 15 is a table showing the measurement results in Example 5.

DETAILED DESCRIPTION OF THE PREFERRED EMBODIMENTS

A measuring system according to an embodiment of the present invention will be described below in detail with reference to the accompanying drawings by exemplifying a solar cell. The output characteristics of a photoelectric conversion device mean output characteristics that are typically expressed by main parameter values such as a maximum power Pmax, photoelectric conversion efficiency η, open-circuit voltage Voc, short-circuit current Isc, fill factor FF, maximum power voltage Vpm, and maximum power current Ipm, which are calculated from the current vs. voltage characteristic and represent the characteristics of the device.

[Outline]

Figure 1:
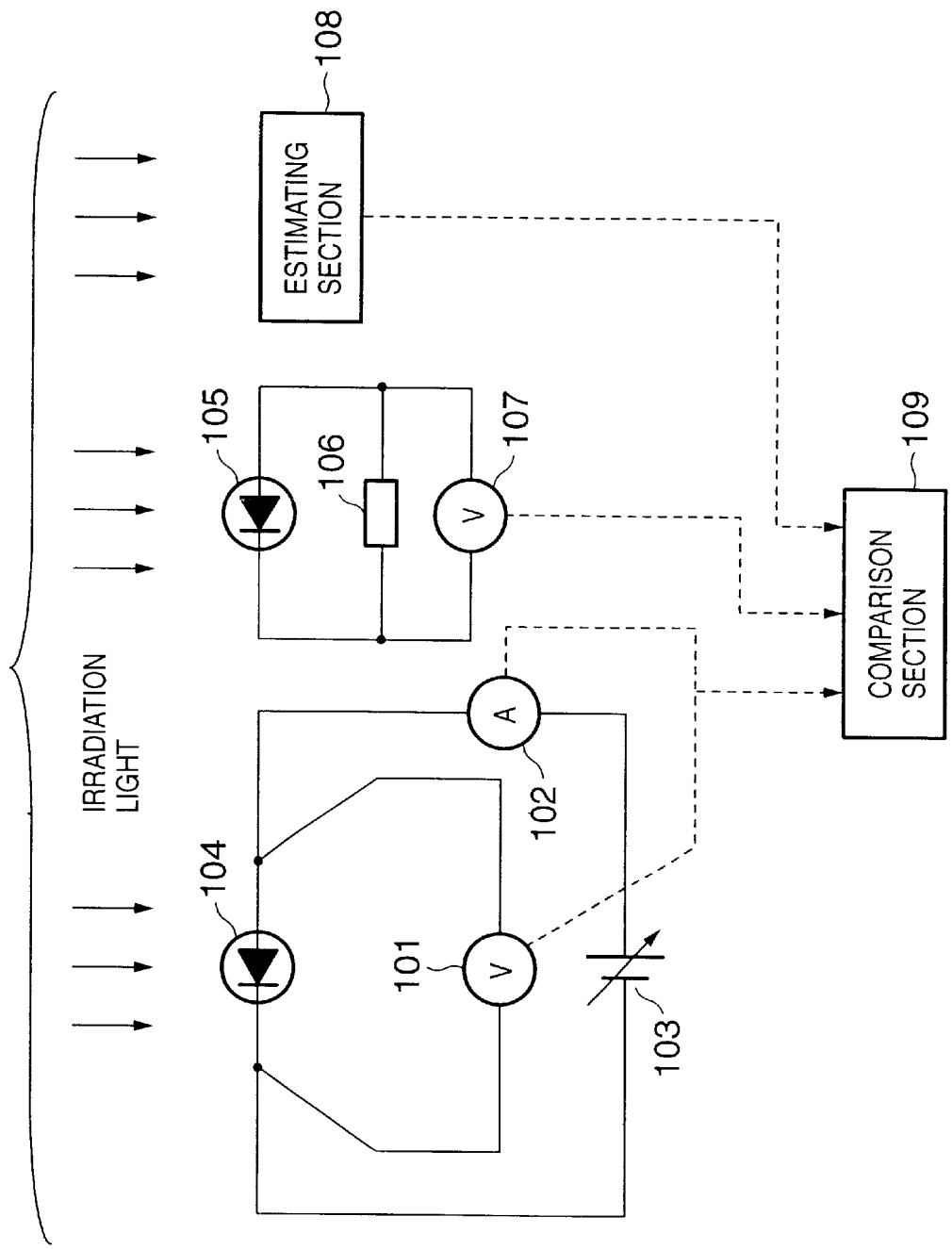
FIG. 1 is a schematic view for explaining the concept of a method and system for measuring the output characteristics of a stacked photoelectric conversion device according to an embodiment of the present invention.

In this embodiment, a measuring system for obtaining the output characteristics of, e.g., a stacked photoelectric conversion device shown in the schematic view of FIG. 1 is constructed. According to this measuring system, the output characteristics of an object 104 to be measured can be measured in light irradiation using an irradiance detector 105, voltage detector 101, current detector 102, and power supply 103 for changing the voltage of the object (photoelectric conversion device) 104 to be measured. When the object 104 to be measured is a stacked photoelectric conversion device, and the irradiation light has a plurality of spectral states with different spectra, the output characteristics of the object 104 to be measured are measured, and simultaneously, an estimating section 108 for estimating a shift, from the standard test condition, of each short-circuit current of each semiconductor junction (to be referred to as a component cell hereinafter) of the object 104 to be measured measures a shift in the plurality of spectral states. The output characteristics of the object 104 to be measured in each of the plurality of spectral states are compared with a shift of each short-circuit current of the component cell from the standard test condition, thereby obtaining the output characteristics of the object 104 to be measured (stacked photoelectric conversion device) in the standard test conditions.

In the above measuring system, the output characteristics of the stacked photoelectric conversion device are measured in the following way.

(1) The irradiance of irradiation light is measured by the irradiance detector 105 first. When the irradiance detector 105 is a reference cell, a resistor 106 is connected, and the short-circuit current is measured by a voltage detector 107. The resistance value of the resistor 106 is preferably 0.1 to 1 Ω.

(2) The voltage and current of the object 104 to be measured are measured while changing the voltage to be applied to the object 104 to be measured by the power supply 103 for changing the voltage of the object 104 to be measured, thereby obtaining a current vs. voltage characteristic. The output characteristics are obtained from the current vs. voltage characteristic.

(3) A shift is obtained by the estimating section 108 for estimating a shift of each short-circuit current of the component cell under irradiation light from the standard test conditions.

(4) The spectrum of the irradiation light is changed, the processes (1) to (3) are repeated in the plurality of spectral states.

(5) The result of (2), which has undergone irradiance correction using the result of (1), is compared with the result of (3) by a comparison section 109, thereby obtaining the correlation between the shift and the output characteristics. Thus, a state wherein the short-circuit current of the component cell has no shift from the standard test condition, i.e., the output characteristics of the object 104 to be measured (stacked photoelectric conversion device) in the standard test conditions can be obtained. In addition, when a change in spectrum of irradiation light is represented by an index in accordance with a shift of each short-circuit current of the component cell from the standard test condition, the spectrum dependence of the output characteristics of the object 104 to be measured (stacked photoelectric conversion device) can be quantified. Furthermore, the output characteristics of the object 104 to be measured (stacked photoelectric conversion device) in an arbitrary spectral state can be predicted for a change in shift of the short-circuit current of the component cell from the standard test condition.

[Shift Estimation]

A more detailed description will be made on the basis of examples of solar cells. First, estimation of a shift of the short-circuit current of each component cell from the standard test condition will be described. This is the most important element here. The methods of estimating a shift of the short-circuit current of each component cell from the standard test condition can be roughly classified into two types, and means are also selected in accordance with the method.

The first method will be described. The spectrum of irradiation light is measured by a spectrometer. The spectral response of a stacked photoelectric conversion device is measured by a spectral response measuring device. The product of the spectral intensity of the irradiation light and the spectral response of the stacked photoelectric conversion device is integrated across a wavelength range for "spectral response>0", thereby obtaining the short-circuit current (short-circuit current under irradiation light) of each component cell.

Next, the product of the spectrum of standard sunlight and the spectral response of the stacked photoelectric conversion device is integrated across a wavelength range for "spectral response>0", thereby obtaining the short-circuit current (to be referred to as a standard short-circuit current hereinafter) of each component cell. The short-circuit current under irradiation light and the standard short-circuit current are compared to estimate a shift of the short-circuit current of each component cell from the standard test condition. In this case, the estimating section 108 for estimating the shift is formed from a spectrometer, spectral response measuring device, and data processing section.

As the second method, using a plurality of photoelectric conversion devices (to be referred to as index cells hereinafter) each having a spectral response approximate to that of each component cell of the stacked photoelectric conversion device, the short-circuit current of each index cell is measured under irradiation light and compared with the short-circuit current of the index cell in the standard test conditions, thereby estimating a shift of the short-circuit current of each component cell from the standard test condition. In this case, the estimating section 108 for estimating the shift is formed from the index cell, short-circuit current measuring device, and data processing section.

Each method will be described below.

For the first method, a spectrometer for the irradiation light and a spectral response measuring device for the photoelectric conversion device are necessary. As the spectrometer, a known spectro-radiometer incorporating a spectroscope is optimum. The wavelength resolving power of the spectro-radiometer is preferably 5 nm or less because the measurement accuracy for the spectral distribution of the irradiation light can be improved. The sensitive wavelength region preferably covers a wide wavelength range equal to or more than a wavelength range including all the spectral responses of the component cells of the stacked photoelectric conversion device. As a simplified structure, a device that combines a photoelectric conversion device such as a sun photometer and an interference filter, or a spectral pyrheliometer may be used. The device preferably has wavelength division enough to detect an increase/decrease in light intensity at each sensitive wavelength of each component cell and an accuracy sufficient for the purpose. The wavelength sensitivity of the spectrometer is preferably periodically calibrated using, e.g., a standard lamp.

When the irradiation light varies over time, like sunlight, measurement of the spectrum using the spectrometer is preferably executed simultaneously with measurement of the output characteristics of the object to be measured (stacked photoelectric conversion device). When a light irradiation system such as a solar simulator of rank A which sufficiently suppresses the time variation ratio of irradiation light is used, the spectrum may be measured before or after measurement of the output characteristics of the object to be measured. Either indoors or outdoors, measurement of the spectrum is preferably done in the same plane as that for measurement of the output characteristics of the object to be measured. When the sunlight spectrum is to be measured outdoors, the measurement is preferably done under the same lighting conditions as those for the object to be measured. That is, when the object to be measured is, e.g., a flat solar cell module whose aperture angle is almost 180°, the spectrum of global solar radiation on the plane must be measured. For this purpose, both direct light and diffused light are preferably measured in well-balance by, e.g., measuring diffused light from a white diffusing plate or using an integrating sphere.

The spectral response of the photoelectric conversion device is measured by a known spectral response measuring method. The stacked photoelectric conversion device is measured herein. To measure the spectral response of each component cell, biased light (light superposed on monochromatic light) having a spectrum adjusted to increase currents generated by component cells other than a component cell to be measured must be obtained by attaching an appropriate filter to a white light source, or by combining light components from a plurality of light sources, such that the current value generated by the component cell to be measured limits the current value of the entire stacked photoelectric conversion device.

When it is difficult to measure the spectral response of the object to be measured itself because the area of the object to be measured (stacked photoelectric conversion device) is large, the measurement value of the spectral response of a small stacked photoelectric conversion device that is prepared in the same way as for the object to be measured may be used. When a number of stacked photoelectric conversion devices are to be produced, the measurement value of the spectral response of a representative stacked photoelectric conversion device may be used.

Let $Et(\lambda)$ be the spectral intensity of irradiation light measured by the above-described method, and $Qn(\lambda)$ be the spectral response of the nth component cell of the stacked photoelectric conversion device, both of which are expressed by functions of a wavelength $\lambda$. A short-circuit current In of the nth component cell is given by $$In = \int Et(\lambda)Qn(\lambda)d\lambda \qquad (2)$$

where the integration range is $Qn(\lambda) > 0$.

Figure 3:
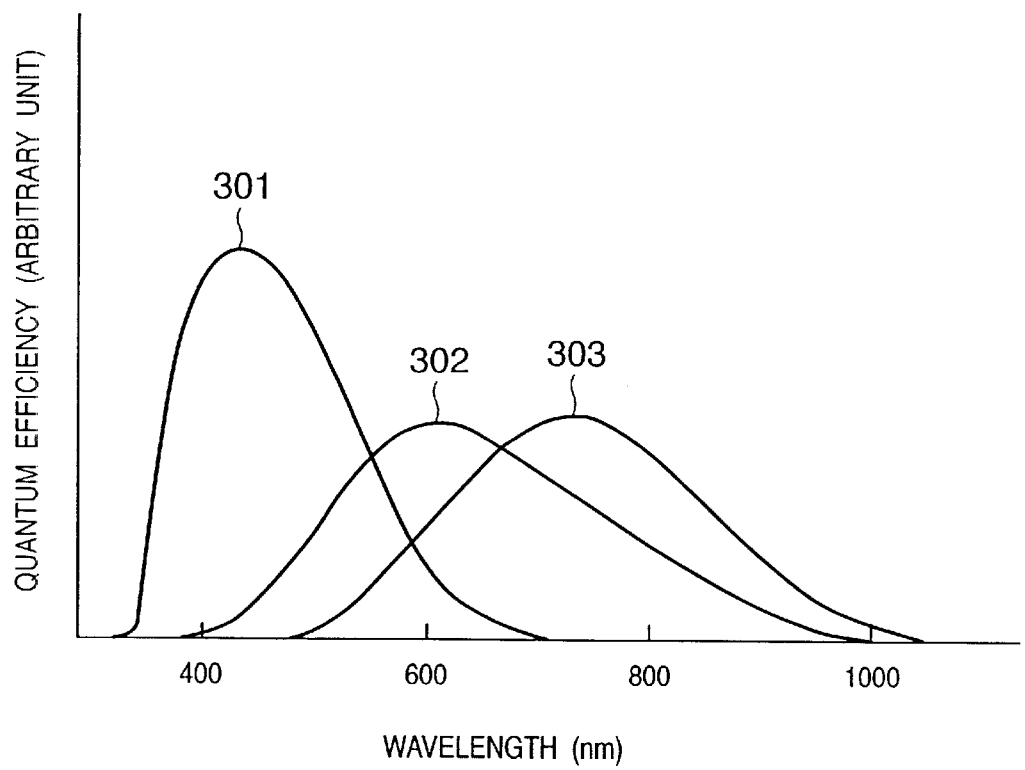
FIG. 3 is a graph showing examples of the spectral response of the stacked photoelectric conversion device as an object to be measured.
Figure 6:
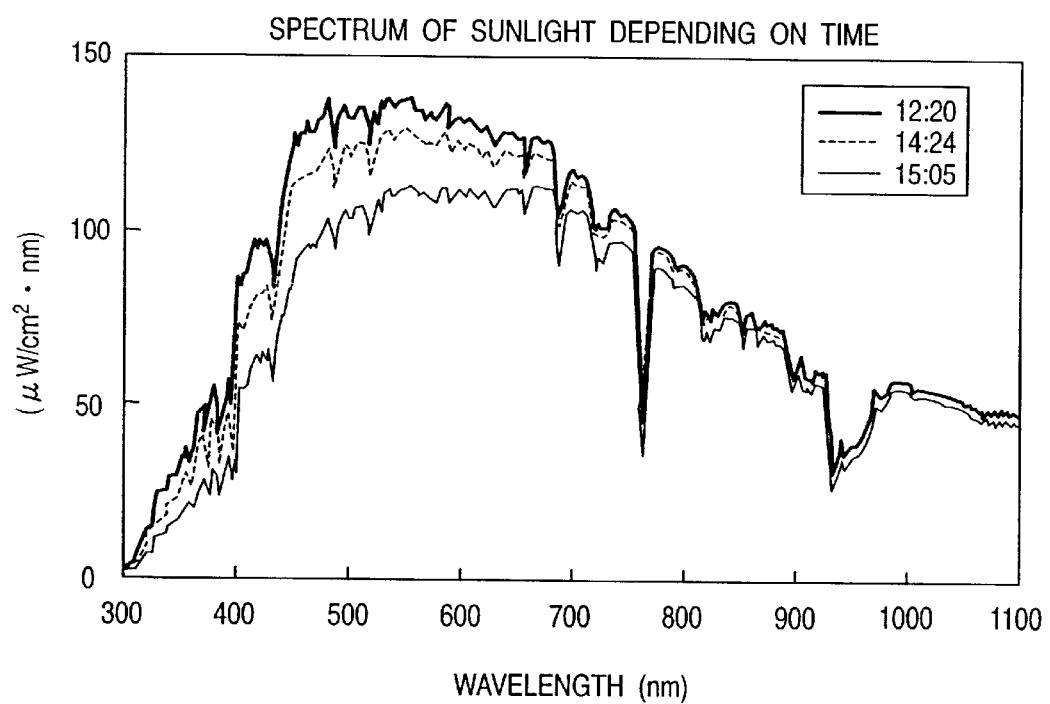
FIG. 6 is a graph showing measurement examples of global solar radiation spectrum of sunlight.

FIG. 3 is a graph showing detailed examples of the spectral response $Qn(\lambda)$ of, e.g., a three-layered stacked photoelectric conversion device. FIG. 6 is a graph showing detailed examples of the spectral intensity $Et(\lambda)$ of irradiation light, e.g., sunlight. If the wavelength resolving power for the spectral intensity of the measured irradiation light is low or an interference filter is used, and only values at a discrete measurement wavelength interval are obtained (e.g., the wavelength interval is 20 nm or more), the short-circuit current In itself to the component cell cannot be obtained. Instead, discrete spectral responses $Qn(\lambda m)$ for the discrete $Et(\lambda)$ wavelength resolving power are calculated, and In' is obtained by $$In' = \Sigma_m Et(\lambda m)Qn(\lambda m) \qquad (3)$$

Figure 5:
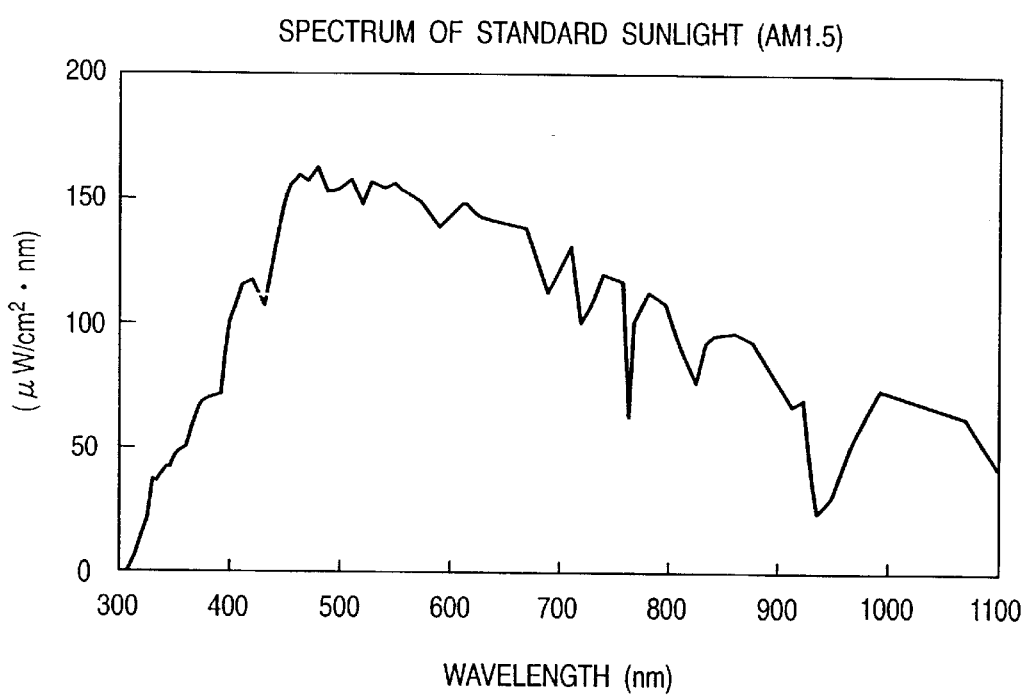
FIG. 5 is a graph showing the spectrum of standard sunlight.

Next, a short-circuit current In0 of each component cell under standard sunlight is obtained by $$In0 = \int Eo(\lambda)Qn(\lambda)d\lambda \qquad (4)$$

where $Eo(\lambda)$ is the spectrum of standard sunlight as shown in FIG. 5, and the integration range is the same as that for equation (2).

Next, for the short-circuit current of each of the n component cells, the ratio of the value In under the irradiation light to the value In0 under the standard sunlight $$Cn = In/In0 \qquad (5)$$

is obtained.

A component cell which limits the short-circuit current of the entire stacked photoelectric conversion device is defined as a current-limiting cell, and the value Cn represented by equation (5) is particularly represented by Clim for the current-limiting cell. The current-limiting cell has the smallest short-circuit currents In and In0 in the n component cells. In the conventional multi-source method, the spectrum of the solar simulator is adjusted such that all the values Cn become "1". However, such adjustment is impossible unless a special solar simulator is used. A normal solar simulator can obtain the value Cn "1" for only one of the n component cells. Preferably, the irradiance of the solar simulator is adjusted such that the short-circuit current of the current-limiting cell matches the value under the standard sunlight to satisfy $$Clim = 1 \quad (6)$$

However, in outdoor measurement or when the spectrum or irradiance has a measurement error, the value Clim need not always be "1".

The total short-circuit currents of the n component cells are obtained for the irradiation light and standard sunlight (see equations (7) and (8))

$$Sum \cdot n = \sum_{n=1}^{n} In \quad (7)$$

$$Sum \cdot n0 = \sum_{n=1}^{n} In0 \quad (8)$$

In equations (5) and (7), if only discrete values for the wavelengths are obtained as Et($\lambda$) or Qn($\lambda$), as described above, In is replaced with In'.

A ratio Csum of Sum.n to Sum.n0 is given by $$Csum = Sum.n/Sum.n0 \quad (9)$$

When the above value is substituted into equation (10), and a coefficient K $$K = \left( \sum_{a=1}^{n} Ca - Clim \right) \Big/ (n-1) \Big/ Clim \quad (10)$$

is calculated, the shift of the spectrum of irradiation light from the standard sunlight can be efficiently and typically expressed. The coefficient K will be referred to as a spectral coefficient hereinafter.

Basically, the irradiance is preferably measured or adjusted by the short-circuit current of the reference cell whose spectral response approximates that of the current-limiting cell of the stacked photoelectric conversion device. However, when the current-limiting cell is unknown, or a number of stacked photoelectric conversion devices having different current-limiting cells are to be measured, the irradiance can be measured or adjusted in the wavelength range of spectral response including all the component cells of the stacked photoelectric conversion device. In theory, the spectral coefficient K is the average value of ratios of the short-circuit currents of the component cells excluding the current-limiting cell under the irradiation light to those under the standard sunlight.

Figure 2:
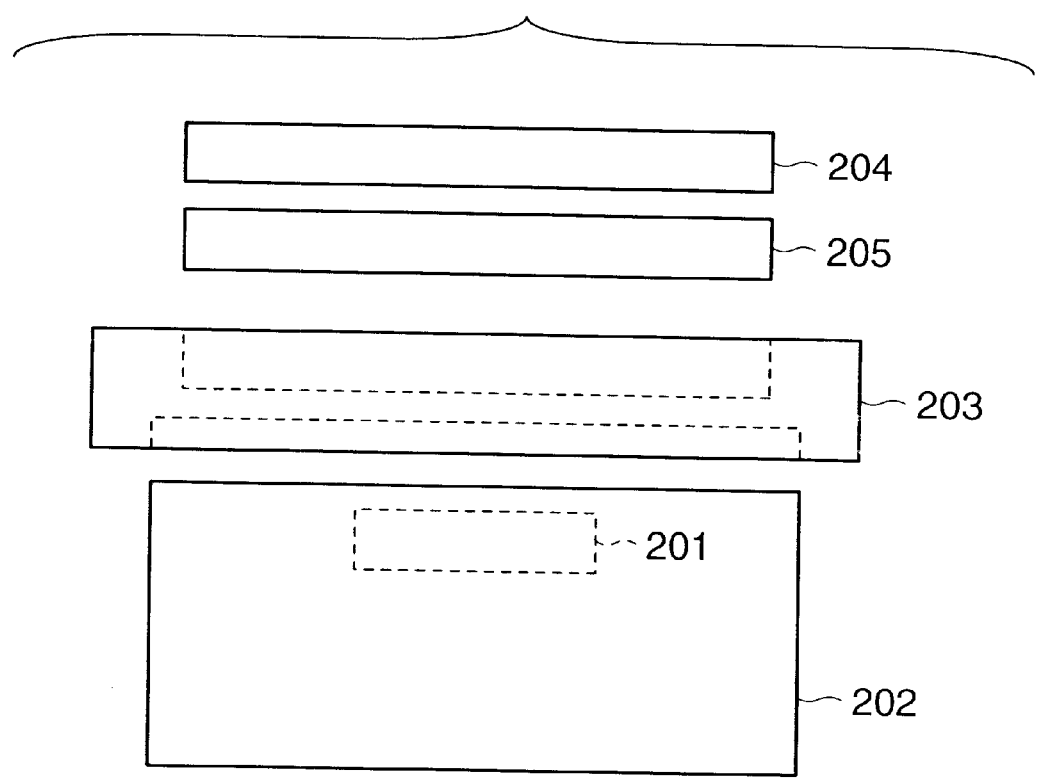
FIG. 2 is a view showing a detailed example of an index cell.

The second method will be described next. In the second method, the above-described photoelectric conversion device (to be referred to as an index cell hereinafter) having a spectral response approximate to that of each component cell is used. The index cell is preferably processed such that the characteristics are stable over time. For example, when the index cell is formed from a material such as an amorphous material which exhibits a light-induced degradation phenomenon, the index cell is preferably irradiated in advance with light for a time enough to stabilize the characteristics. The index cell is also preferably a so-called single cell having a single semiconductor junction. The index cell may be formed using a material different from that of each component cell of the stacked photoelectric conversion device. In this case, to obtain an equivalent spectral response, optical filters 204 and 205 may be arranged on the light-receiving surface side, as shown in FIG. 2. In addition, the index cell preferably has a light-receiving surface whose material and form are the same as those of the stacked photoelectric conversion device. If impossible, at least the uppermost surface on the light incident side preferably has the same material and form as those of the stacked photoelectric conversion device. This is especially important for outdoor measurement using sunlight because light incidence on the semiconductor junction changes depending on the material and form of the uppermost surface.

FIG. 2 is an exploded view showing a detailed example of the index cell. Reference numeral 201 denotes a photoelectric conversion device; 202, a case of the photoelectric conversion device; 203, an optical filter holder; and 204 and 205, optical filters. A mismatch coefficient Mn given by $$Mn = \int Eo(\lambda) Qrn(\lambda) d\lambda \Big/ \int Et(\lambda) Qrn(\lambda) d\lambda \times \\ \int Et(\lambda) Qn(\lambda) d\lambda \Big/ \int Eo(\lambda) Qn(\lambda) d\lambda \quad (11)$$

where Qrn($\lambda$) is the spectral response of an index cell corresponding to the nth component cell, which is an index representing the degree of approximation of each reference cell with respect to each component cell, preferably falls within the range of 0.98 to 1.02.

Figure 4:
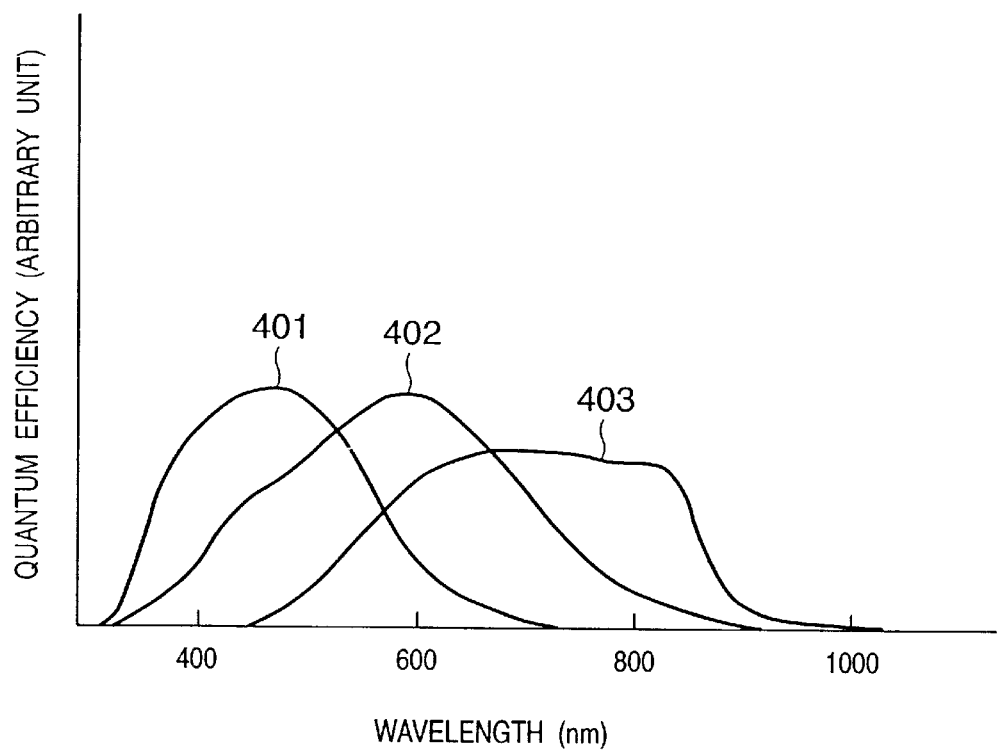
FIG. 4 is a graph showing examples of the spectral response of the index cell.

FIG. 4 is a graph showing detailed examples of the spectral response Qrn($\lambda$) of an index cell for, e.g., a three-layered stacked photoelectric conversion device.

When an index cell that satisfies the above conditions is used, an accurate spectral coefficient can be obtained. To measure the spectral coefficient by the second method using the index cell, instead of using In and In0 obtained by equations (2) and (4) in the first method, calculations from equation (5) in the first method are executed using short-circuit current values Irn and Irn0 of each index cell under the irradiation light and under the standard sunlight.

The short-circuit current value Irn of the nth reference cell under the irradiation light can be obtained by measuring the short-circuit current of the index cell. To obtain the short-circuit current of the index cell, preferably, the index cell is almost short-circuited by a resistor having a resistance value of 0.1 to 1 $\Omega$, and the voltage across the resistor is measured. The temperature of the index cell is preferably adjusted to 25° C.±2° C. If the temperature is hard to adjust, the temperature coefficient of the short-circuit current of the index cell is measured in advance, and temperature correction is executed to obtain a short-circuit current at 25° C. The short-circuit current value Irn0 of the nth index cell under the standard sunlight is obtained by a method equivalent to a known calibration method for a primary reference crystal-based solar cell (described in, e.g., the annex of JIS C 8911).

As a characteristic feature of spectral coefficient measurement by the second method, an index cell having a spectral response that keeps the above-described mismatch coefficient Mn within the range of 0.98 to 1.02 even when the spectrum of the irradiation light varies to some extent is used in advance whereby the spectral coefficient can easily be obtained without using any spectrometer and without measuring the spectrum of the irradiation light every time.

[Comparison Between Shift of Short-circuit Current and Output Characteristics]

Comparison between a shift of the short-circuit current and the output characteristics will be described next. First, a method of comparing the output characteristics of a stacked photoelectric conversion device with a shift of the short-circuit current of each component cell from the standard test condition will be described below.

Figure 7:
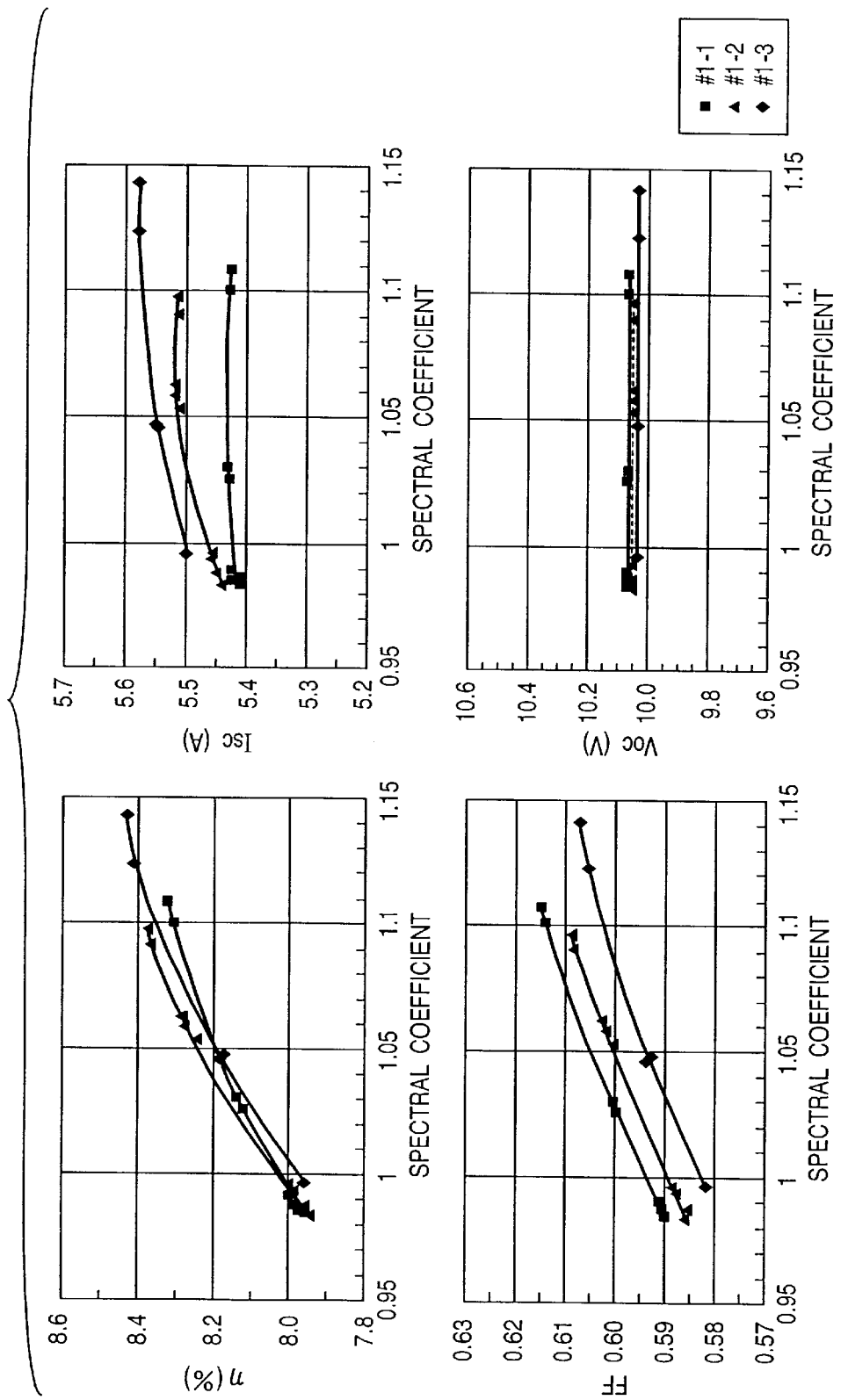
FIG. 7 shows graphs of variation of output characteristics of the stacked photoelectric conversion device with respect of a spectral coefficient K.

In a plurality of spectral states, a plurality of spectral coefficients K are obtained from a shift. A graph is made by plotting the spectral coefficient K along the abscissa and the output characteristics of the stacked photoelectric conversion device with respect to the spectral coefficient K along the ordinate. More specifically, graphs are formed by plotting the maximum power Pmax, photoelectric conversion efficiency η, open-circuit voltage Voc, short-circuit current Isc, fill factor FF, maximum power voltage Vpm, and maximum power current Ipm along the ordinate. More specifically, graphs shown in FIG. 7 are formed.

Next, the graphs of the above-described characteristics with respect to a plurality of spectral coefficients K are connected by smooth curves or lines. The spectrum closest to the standard sunlight is obtained when the spectral coefficient K is "1". The values of the respective characteristics when K=1 are obtained by interpolation or extrapolation in the graphs, thereby obtaining the output characteristics of the stacked photoelectric conversion device under the standard sunlight. In addition, the spectrum dependences of the output characteristics of the stacked photoelectric conversion device are obtained from the graphs. Furthermore, the spectral coefficient K when the spectrum changes is calculated, thereby predicting a change in output characteristics of the stacked photoelectric conversion device by the spectrum.

The larger the number of output characteristics in spectral states with different spectral coefficients K becomes, the clearer the tendency of each graph becomes. Hence, the output characteristics in the standard conditions, spectrum dependence of the output characteristics, and the prediction of a change in output characteristics by the spectrum can be more accurately obtained. For example, to check whether the graph of each characteristic will change linearly or non linearly by the spectral coefficient K, at least data at three points with different spectral coefficients K are necessary. To obtain the value of each characteristic when K=1, it is preferable that there are data capable of interpolation for K rather than extrapolation. That is, data for both K>1 and K<1 are preferably present.

To compare a change in output characteristics of the stacked photoelectric conversion device with a change in shift of the short-circuit current of each component cell from the standard test condition, preferably, data of the output characteristics of the photoelectric conversion device are acquired and the spectral coefficient K is obtained to form the above-graphs. More specifically, a data processing apparatus such as a personal computer capable of transmitting/receiving data to/from the measuring device is preferably used. The data processing apparatus also preferably has a measuring device control function.

As an index representing the magnitude of an error in the above measuring method, the following numerical value can be used. Using equations (12) and (13), an index Kn is calculated for each component cell. Equation (13) is used when the current-limiting cell is undefined. Next, the index Kn is plotted on a graph with respect to the spectral coefficient K. As for the output characteristics, the value of the index Kn when K=1 is obtained by interpolation or extrapolation, and the value is defined as Kn1. Next, a standard deviation σ(Kn1) of n values Kn1 is obtained by equation (14).

$$Kn = Cn/Clim \tag{12}$$

$$Kn = Cn/Csum \tag{13}$$

$$\sigma(Kn1) = \sqrt{\sum_{a=1}^{n}(Ka1-1)^2/n} \tag{14}$$

As the value σ(Kn1) becomes close to 0, the short-circuit current of each component cell when K=1 becomes close to the short-circuit current value in the standard test conditions. Hence, any error in output characteristics in the standard test conditions, which are obtained by the measuring method of the present invention, can be reduced.

[Reference Photoelectric Conversion Device]

A reference photoelectric conversion device will be described next.

Conditions of the reference photoelectric conversion device will be described below by exemplifying a solar cell. The solar cell is called a reference solar cell which will be referred to as a reference cell hereinafter. A stacked photoelectric conversion device as an object to be measured will be referred to as a sample cell hereinafter. As the reference cell, a cell identical to the index cell can be used. If reference and index cells identical to each other are used, the index cell for detecting the irradiance will be referred to as a reference cell.

(1) The reference cell may be a stacked photoelectric conversion device, like the sample cell, or may be formed from a different material. The reference cell preferably has a spectral response similar to that of the sample cell. First, when the reference cell is a stacked photoelectric conversion device, like the sample cell, preferably, the above-described current-limiting cell of the reference cell which limits the short-circuit current in the entire stacked reference solar cell, is formed from a component cell of the same type as that of the sample cell, and the current-limiting cells of the reference cell and sample cell have approximate spectral responses. Which component cell functions as the current-limiting cell changes depending on the spectrum of irradiation light. However, at least in the standard test conditions, the current-limiting cells of the reference cell and sample cell are formed from component cells of the same type. Second, when the reference cell is made of a material different from that of the sample cell, the spectral response of the reference cell preferably approximates that of the current-limiting cell of the sample cell. Of the above-described index cells, a cell having a spectral response approximate to that of the current-limiting cell of the sample cell may be used as the reference cell. With the above arrangement, in measuring the irradiance of irradiation light using the reference cell, an accurate result can be obtained, and consequently, the output characteristics of the stacked photoelectric conversion device can be accurately measured.

(2) The reference cell is preferably processed such that the characteristics are stable over time. When the reference cell is made stable with respect to light, heat, temperature, and the like, the reliability of current vs. voltage characteristic of the reference cell in the standard test conditions increases, and the output characteristics of the sample cell can be accurately measured. In addition, the time interval of current vs. voltage characteristic re-measurement in the standard test conditions can be increased.

(3) The short-circuit current of the reference cell in the standard test conditions is preferably measured in advance. The short-circuit current in the standard test conditions is obtained by a method equivalent to a known calibration method for a primary reference crystal-based solar cell (described in, e.g., the annex of JIS C 8911). When the reference cell is a stacked photoelectric conversion device, the short-circuit current in the standard test conditions is preferably obtained using the method of the present invention. The short-circuit current in the standard test conditions may be obtained using the multi-source method, supplementary light source method, or standard sunlight method.

(4) As the reference cell, a cell whose temperature coefficient of the short-circuit current is known is preferably used. If it is difficult to measure the temperature coefficient of the reference cell itself, the value of the temperature coefficient of a similar photoelectric conversion device may be used. In measuring the sample cell using the reference cell, the reference cell temperature is preferably adjusted to 25° C.±2° C. If the temperature is hard to adjust, temperature correction must be executed by the above-described temperature coefficient to obtain a characteristic at 25° C.

(5) For the relationship between current-limiting cells of the reference cell and the sample cell, the mismatch coefficient Mn given by $$Mn = \int Eo(\lambda)Qr(\lambda)d\lambda \Big/ \int Et(\lambda)Qr(\lambda)d\lambda \times \int Et(\lambda)Qlim(\lambda)d\lambda \Big/ \int Eo(\lambda)Qlim(\lambda)d\lambda \quad (15)$$

where
Qr($\lambda$): the spectral response of the reference cell or the spectral response of the current-limiting cell of the reference cell
Qlim($\lambda$): the spectral response of the current-limiting cell of the sample cell,
Mn preferably falls within the range of 0.98 to 1.02.

(6) When the irradiance of irradiation light has a positional variation, like a pseudo sunlight source, the active area of the reference cell preferably approximates the active area of the minimum unit portion formed on one substrate that constructs the sample cell within the range of ±20%, more preferably within the range of ±10%, and most preferably within the range of ±5%. This is because when the active area of the reference cell approximates that of the sample cell, any error due to the positional variation in irradiation light can be largely reduced. When the sample cell has a form (so-called module or array) in which a plurality of stacked photoelectric conversion devices are connected in series and/or in parallel, the active area of the minimum unit portion (to be referred to as a submodule hereinafter) on the single substrates that are connected in series and/or in parallel need only approximate the active area of the reference cell.

[Stacked Photoelectric Conversion Device]

The stacked photoelectric conversion device to be measured will be described next.

The stacked photoelectric conversion device to be measured by the output characteristic measuring method to be described here has a structure in which a plurality of semiconductor junctions are stacked. When an electrode is extracted from each of two semiconductor junctions stacked, the cell is called a four-terminal type. When a plurality of semiconductor junctions are connected in series, and electrodes are formed only at the two ends, the cell is called a two-terminal type. The output characteristic measuring method of present invention can be applied to either type and offers a remarkable effect especially for the two-terminal type device.

Examples of stacked photoelectric conversion device are a solar cell, photodiode, photosensor, and electrophotographic photosensitive body. Examples of semiconductor junction are a pn junction, pin junction, and MIS junction.

Semiconductor materials include crystalline, poly crystalline, micro-crystalline, and amorphous materials. Examples of substance are group IV or IV compounds such as Si, SiC, SiGe, C, and Ge, group III-V compounds such as GaAs, AlGaAs, InP, and InSb, group II-VI compounds such as ZnSe, ZnO, CdS, CdTe, and $Cu_2S$, group I-III-$VI_2$ compounds such as $CuInSe_2$ and $CuInS_2$, organic semiconductors, and mixtures of the above-described compounds.

According to the output characteristic measuring method of the present invention, the size and area of the stacked photoelectric conversion device as an object to be measured are not limited. For, e.g., a solar cell, devices such as a cell, submodule, module, and array with various sizes and areas can be measured. A device formed by appropriately connecting cells, submodules, or modules in series or in parallel may be measured. A solar cell installed outdoors as a photovoltaic power generation system may be measured.

The temperature coefficient of the current vs. voltage characteristic of the stacked photoelectric conversion device (to be referred to as a sample cell hereinafter) as the object to be measured is preferably known. More specifically, the temperature coefficients of the open-circuit voltage Voc, short-circuit current Isc, and fill factor FF are preferably known. If it is hard to measure the temperature coefficient of the sample cell itself, the representative value of the temperature coefficient of an equivalent stacked photoelectric conversion device may be used. In measuring the sample cell, the temperature of the sample cell is preferably adjusted to 25° C.±2° C. If it is difficult to adjust the temperature, the temperature must be corrected using the above-described temperature coefficient, and the characteristic at 25° C. must be obtained.

[Irradiation Light]

Irradiation light will be described next.

Light used in the output characteristic measuring method of the present invention may be either natural light or light from an artificial light source. For, e.g., a solar cell, sunlight or a pseudo sunlight source is preferably used. When sunlight is used, the measurement is preferably executed within the irradiance range of 500 to 1,500 $W/m^2$, and more preferably, 800 to 1,200 $W/m^2$. As the irradiance becomes close to 1,000 $W/m^2$, the irradiance correction amount becomes small, and therefore, any error due to irradiance correction can be reduced. Since the temperature of the standard cell or sample cell readily increases, the sunlight is preferably shielded before the start of measurement and sent onto the reference cell or sample cell immediately before the measurement. With this operation, since any increase in cell temperature can be reduced, and the correction amount by the above-described temperature correction coefficient becomes small, any error by temperature correction is reduced, and the measurement can be more accurately done.

When a pseudo sunlight source is used, a known solar simulator is preferably used. As the lamp of light source, a xenon lamp or metal halide lamp is preferably used. The lighting method can be either continuous lighting or pulse lighting. When the pseudo sunlight source is used, a change in spectrum due to a change in or exchange of an optical component poses a serious problem in measuring a stacked photoelectric conversion device with characteristics sensitive to the spectrum. However, according to the output characteristic measuring method of the present invention, since a change in measurement value when the spectrum changes can be obtained, the output characteristics can be accurately measured even when the spectrum changes.

When an optical component of the pseudo sunlight source is intentionally changed or exchanged, a plurality of spectral states can be obtained. When the above-described spectral coefficients K are obtained, and the output characteristics of the stacked photoelectric conversion device are plotted on graphs, the output characteristics of the stacked photoelectric conversion device in the standard test conditions can be obtained, and the spectrum dependences of the output characteristics of the stacked photoelectric conversion device can be quantified.

Example of the optical component to be changed or exchanged to change the spectrum are the lamp of a light source, mirror (e.g., elliptical mirror or flat mirror), and air mass filter. The spectrum can also be changed by changing the value of the current flowing to the lamp of a light source.

When a cell or module having a large area is to be measured indoors, the solar simulator must also have a large effective irradiation area. Conventionally, a solar simulator excellent in both the degree of spectral match and the positional variation in irradiance is required. As the area becomes large, the manufacturing cost of the solar simulator acceleratingly increases. In the output characteristic measuring method of the present invention, since an emphasis is placed on the positional variation in irradiance of the solar simulator while a compromise can be made for the degree of spectral match, an accurate measuring system with a large area can be built at low cost.

[Irradiance Detector]

The irradiance detector will be described next.

The irradiance of light with which the stacked photoelectric conversion device to be measured is irradiated can be detected by a known solar cell, photodiode, or pyranometer using a thermocouple. Finally, the irradiance is preferably measured by the reference photoelectric conversion device, as described above. The reference photoelectric conversion device may be used from the beginning. The measurement value of the irradiance changes depending on the detector. Like the reference photoelectric conversion device, a device having a spectral response approximate to that of the photoelectric conversion device as the object to be measured is preferably used.

[Others]

As voltage and current detectors, a known means such as a digital multi-meter or a combination of a resistor and analog-digital conversion board (AD board) is used. As a power supply for changing the voltage of the stacked photoelectric conversion device as the object to be measured, a known means such as a bipolar power supply, electronic load, or discharge of charges accumulated in a capacitor is used.

To control the above measuring devices and process measured data, a data processing section such as a personal computer capable of transmitting/receiving data to/from the measuring devices is preferably used. The data processing section preferably has a measuring device control function and also preferably can program measuring device control.

Examples will be described below in detail. These are mere examples and do not limit the present invention.

EXAMPLE 1

The output characteristics of stacked photoelectric conversion devices (samples) as objects to be measured, and in this case, three triple solar cell modules each having a structure, in which a pin junction (to be referred to as a top cell hereinafter) using amorphous silicon for an i-layer, a pin junction (to be referred to as a middle cell hereinafter) using amorphous silicon germanium for an i-layer, and a pin junction (to be referred to as a bottom cell hereinafter) using amorphous silicon germanium for an i-layer were stacked from the light incident side, were measured outdoors using sunlight in the following way.

Each triple solar cell module had a module form in which five cells having a size of 35 cm×24 cm and formed on a single stainless steel substrate were connected in series on a support plate via bypass diodes, and a surface protective layer was formed. The outer size of the module was about 140 cm×42 cm. The samples were numbered #1-1, #1-2, and #1-3. The three solar cell modules were irradiated with light from a solar simulator for 1,000 hrs and degraded while keeping the module temperature at 50° C. so as to stabilize the output characteristics in advance.

Because of the large area, it was difficult to directly measure the spectral responses of the three solar cell modules. Instead, three solar cells each having a size of 1 cm×1 cm were prepared in the same lot as that of the three solar cell modules and irradiated with light for 1,000 hrs. Then, the spectral response of each of the small samples was measured by a known spectral response measuring method. FIG. 3 is a graph showing the results. FIG. 3 shows the spectral response data of a solar cell prepared in the same lot as that of sample #1-1. Referring to FIG. 3, a curve 301 represents the spectral response of the top cell, a curve 302 represents the spectral response of the middle cell, and a curve 303 represents the spectral response of the bottom cell.

In measuring the spectral response of the top cell which was sensitive to the short-wavelength region, bias light having intensity in the predicted sensitivity wavelength region of the middle and bottom cells, i.e., light obtained by cutting, from white light, the short-wavelength region where the spectral response of the top cell was high, was superposed on monochromatic light obtained through a spectroscope, and the top cell was irradiated with that light to limit the current of the entire triple solar cell module by the current of the top cell. The middle and bottom cells were also measured while being irradiated with appropriate bias light with which the cell to be measured limits the entire current, in the same way as the top cell. The measurement data were obtained at an interval of 10 nm.

Next, the product of the data of spectrum of standard sunlight shown in FIG. 5 and each spectral response measurement data shown in FIG. 3 were integrated in accordance with equation (4). As a result, the short-circuit currents of the top, middle, and bottom cells of each of the three samples were calculated. FIG. 8 is a table showing the results. As is apparent from FIG. 8, in sample #1-1, the top cell had the smallest short-circuit current. This means that the top cell is the current-limiting cell that limits the short-circuit current of the entire stacked photoelectric conversion device under standard sunlight. In sample #1-2, the middle cell was the current-limiting cell, and in sample #1-3, the bottom cell was the current-limiting cell.

The output characteristics of the three solar cell modules were measured in the following way. To measure the output characteristics of the modules, on a fine day with few clouds, the three solar cell modules were mounted on a frame (to be referred to as an automatic tracking frame hereinafter) which automatically tracked the sun to obtain a predetermined sunlight incidence angle with respect to the module surface such that the direct sunlight always entered perpendicularly to the module plane. Since it was difficult to adjust the module temperature outdoors, the modules to which light-shielding plates were attached in an air-conditioned room were quickly carried outside and set on the automatic tracking frame. Immediately after the light-shielding plates were detached, the current vs. voltage characteristics were measured in the following way.

As the power supply for changing the voltage, a known programmable bipolar power supply (R6246 available from ADVANTEST K.K.) was used. The bipolar power supply was controlled by a personal computer to sweep the voltage in a step pattern. As the voltage and current detectors, the above-described R6246 was commonly used because it had a measuring function. In measuring the current, a delay time was set from voltage setting to current measurement in consideration of the voltage rise time and the capacitance of the sample module. The voltages were set at 256 points in such a way that the voltage interval became small as the voltage became close to the open-circuit voltage Voc of the module. In this case, without changing the number of voltage set points, data near the maximum power could be more precisely measured than a case wherein the voltage was swept at equal intervals, and the measurement accuracy improved. With the above procedure, the current vs. voltage characteristics of the three solar cell modules were obtained.

In addition, the measurements at the 256 points could be executed in 0.5 sec or less by storing the data set of the sweep voltage in the memory of the bipolar power supply in advance. Since the increase in module temperature immediately after the light-shielding plate was detached was about 0.15° C./sec when the irradiance of sunlight was 1,000 W/m$^2$ (1 sun), any error by the module temperature during current vs. voltage characteristic measurement could be sufficiently reduced.

In this example, since the increase in module temperature due to the sunlight was unavoidable, as described above, it was hard to measure the current vs. voltage characteristic at 25° C. The irradiance value was not always 1,000 W/m$^2$, either. Hence, known irradiance correction and temperature correction (described in, e.g., JIS C 8934) were necessary. For temperature correction, a temperature coefficient $\alpha$ of the short-circuit current Isc and a temperature coefficient $\beta$ of the open-circuit voltage Voc were necessary. They were calculated from a value obtained by measuring the temperature coefficient of the above-described small sample with a size of 1 cm×1 cm by a known temperature coefficient measuring method. For irradiance correction, the value of a series resistance Rs was necessary. This was measured in advance by a known method of measuring the current vs. voltage characteristic of the module while changing the irradiance indoors. By the irradiance correction and temperature correction, the current vs. voltage characteristic at an irradiance of 1,000 W/m$^2$ and module temperature of 25° C. was obtained, and then, the output characteristics such as a maximum power Pmax, photoelectric conversion efficiency η, open-circuit voltage Voc, short-circuit current Isc, and fill factor FF were calculated. To calculate the photoelectric conversion efficiency η, the aperture area (4031.5 cm$^2$) of the module was used.

The module temperature was measured by two methods: a method of measuring the module temperature by bonding a sheet-type thermocouple to the lower surface of the module, and a method of measuring in advance the open-circuit voltage Voc in the standard test conditions and the temperature coefficient of the open-circuit voltage Voc of the module and calculating the module temperature from the open-circuit voltage Voc obtained from the current vs. voltage characteristic. The former method is preferably used when the open-circuit voltage Voc in the standard test conditions is unknown and can hardly be estimated. The latter method is preferably used when the open-circuit voltage Voc in the standard test conditions can be estimated because the average temperature of the semiconductor junction portions of the module can be more accurately measured. In this example, the latter method was used because the open-circuit voltage Voc in the standard test conditions could be estimated by executing indoor measurement using the solar simulator in advance.

As the reference photoelectric conversion device (reference cell), three reference cells (reference cells 1, 2, and 3) were prepared by attaching optical filters 204 and 205 with three combinations below to the light incident side of a crystal silicon solar cell 201 having a size of 1 cm×1 cm, as shown in FIG. 2.

For reference cell 1, a filter for passing blue light to which wavelength the top cell was sensitive and a filter for absorbing infrared light were mainly combined. As the filters, e.g., HA30 and B460 available from HOYA K.K. can be used. With this combination, reference cell 1 having a spectral response indicated by a curve 401 in FIG. 4, which approximated that (curve 301 in FIG. 3) of the top cell of the sample cell, was prepared.

For reference cell 2, to approximate the spectral response of the middle cell, HA30 available from HOYA K.K. and LB-A8 available from Toshiba Glass K.K. were used as filters. As a result, a spectral response indicated by a curve 402 in FIG. 4, which approximated the spectral response (curve 302 in FIG. 3) of the middle cell of the sample cell, was obtained.

For reference cell 3, to approximate the spectral response of the bottom cell, CF870 (interference filter called a cold filter for cutting the long-wavelength side) available from HOYA K.K. and A-73B available from Toshiba Glass K.K. were used as filters. As a result, a spectral response indicated by a curve 403 in FIG. 4, which approximated the spectral response (curve 303 in FIG. 3) of the bottom cell of the sample cell, was obtained.

The Japan Quality Assurance Organization (JQA) was requested to calibrate each reference cell as a primary reference solar cell in advance, and a short-circuit current value (calibration value) in the standard test conditions was obtained. As a consequence, the calibration values were 5.17 mA for reference cell 1, 7.56 mA for reference cell 2, and 7.29 mA for reference cell 3. As the package of each reference cell, a known package (e.g., described in JIS C 8911) using an aluminum block with a black anodized surface was used. A Peltier element was attached to the outer side of the package to adjust the cell temperature to 25° C.±2° C.

As irradiance detectors, a pyranometer and reference cells 1, 2, and 3 were used, which were set on the automatic tracking frame to be flush with the module to be measured. The irradiance measurement value changes depending on the detector. Measurement values obtained by reference cells 1, 2, and 3 were used in correspondence with the top cell, middle cell, and bottom cell as the current-limiting cells of modules #1-1, #1-2, and #1-3 to be measured.

Simultaneously with measurement of the output characteristics of the modules to be measured, the total solar irradiance spectrum incident on the modules to be measured was measured in accordance with the following procedure. First, to measure the direct light and diffused light of sunlight with good balance, a known flat white diffusing plate was prepared. Light diffused by the white diffusing plate was received by an optical fiber and passed through a spectroscope to instantaneously obtain the spectrum using a known spectro-radiometer (MCPD2000 available from Otsuka Electric K.K.) having a number of detectors for the respective wavelengths. The wavelength sensitivity of the set of the white diffusing plate, optical fiber, and spectro-radiometer was calibrated in advance using the spectral irradiance standard bulb of a 500-W halogen lamp calibrated by the Japan Electric Meters Inspection Corporation. The white diffusing plate was set on the automatic tracking frame to be flush with the modules to be measured, and the total solar irradiance spectrum on the tilt surface was measured simultaneously with measurement of the current vs. voltage characteristics of the modules, and average data for about 0.5 sec required for measurement of the current vs. voltage characteristics of the modules to be measured was obtained.

On another measurement day and time, the above-described measurement of output characteristics and measurement of solar spectrum were repeated. The measurements were done while selecting conditions under which the irradiance fell within the range of 800 to 1,200 $W/m^2$. In addition, to obtain a plurality of spectral states, measurements were done under various air mass value conditions. As an example of the spectrum, when measurements were executed at different times by the above method, the solar spectra shown in FIG. 6 were obtained.

The mismatch coefficients between reference cells 1, 2, and 3 and the top cell, middle cell, and bottom cell of the samples were calculated in accordance with equation (15). All the values desirably fell within the range of 0.99 to 1.01. As described above, since the reference cells had spectral responses approximate to those of the current-limiting cells of the samples, and the mismatch coefficients were almost "1", the accuracy of the measurement results of the output characteristics of the samples improved.

Next, the product of the measured total solar irradiance and the above-described spectral response was integrated by equation (2) described above. From the resultant value In, the spectral coefficient K in each spectral state was obtained using equation (10). For the three modules, the spectral coefficients K obtained in the respective spectral states and the output characteristics obtained in the above-described process, i.e., the photoelectric conversion efficiency η, open-circuit voltage Voc, short-circuit current Isc, and fill factor FF were plotted on the graphs shown in FIG. 7.

From the graphs shown in FIG. 7, the values of the output characteristics when the spectral coefficient K was "1" were obtained. The values are shown in FIG. 9. The output characteristics when the spectral coefficient K is "1" are closest to those under the standard sunlight spectrum. Hence, the output characteristics of the stacked solar cell module in the standard test conditions could be measured by the method of the present invention, as shown in FIG. 9. Since the above-described value σ(Kn1) is 0.01 for all the samples, presumably any error by the measuring method of the present invention is sufficiently small.

Furthermore, from the graphs shown in FIG. 7, a change in each output characteristic due to a change in spectrum could be quantified. As is apparent from FIG. 7, the change in photoelectric conversion efficiency η of the triple solar cell module due to the spectrum was mainly dominated by the change in fill factor FF and had a strong positive correlation with the spectral coefficient K independently of the current-limiting cell. The open-circuit voltage Voc rarely changed depending on the spectral coefficient K, and the change in short-circuit current Isc was also small.

Additionally, when the spectral coefficient K in an arbitrary spectral state was calculated using equation (10), the output characteristics of the triple solar cell in the arbitrary spectral state could be predicted from the graphs shown in FIG. 7.

COMPARATIVE EXAMPLE 1

In Comparative Example 1, to verify the accuracy of the measurement results obtained by the measuring method of Example 1 of the present invention, the samples of Example 1 were measured by a method equivalent to the standard sunlight method. The method equivalent to the standard sunlight method requires not only a fine day but also an air mass, turbidity, and precipitable water close to the standard values. Hence, six months or more were required until such conditions were obtained. FIG. 10 shows the measurement results.

FIG. 11 shows results obtained by dividing the results of Example 1 shown in FIG. 9 by the values shown in FIG. 10 and representing the increase/decrease in each value in percentage.

As is apparent from the results shown in FIG. 11, the error between the measurement results of Example 1 and those by the method equivalent to the standard sunlight method was 1% or less. As is apparent from the results shown in FIG. 11, accurate measurement results could be obtained by the measuring method of the present invention without using any method such as standard sunlight with a few measurement opportunities. In addition, according to the measuring method of the present invention, measurement opportunities could be greatly increased without limiting the solar spectrum condition as long as the day was fine.

EXAMPLE 2

The output characteristics of a stacked photoelectric conversion device in the standard test conditions were measured in accordance with the same procedure as in Example 1 except that the stacked photoelectric conversion device as an object to be measured was changed to an a-Si/c-Si double solar cell module in which a pin junction (to be referred to as an a-Si cell hereinafter) using amorphous silicon for an i-layer and a pn junction (to be referred to as a c-Si cell hereinafter) using single-crystal silicon for an n-layer were stacked in this order from the light incident side, and filters used for the standard cell were changed.

The double solar cell module was a so-called super straight module having a size of about 95 cm×55 cm in which 15 serial×3 parallel double solar cells each formed on a single-crystal silicon wafer with a size of about 10 cm×10 cm were connected. When the spectral response of a small sample was measured as in Example 1, the current-limiting cell was the a-Si cell.

For the reference cell, a combination of optical filters was used on the light incident side of a crystal silicon solar cell, as in Example 1. As the optical filters, HA30 available from HOYA K.K. and C-50S available from Toshiba Glass K.K. were used. Since the spectral response extended to the long-wavelength side as compared to the top cell of Example 1, the optical filters were changed to extend the spectral response of the reference cell to the long-wavelength such that the spectral response approximated that of the a-Si cell of this example.

As in Example 1, in a plurality of spectral states, the output characteristics of the solar cell were measured, and the spectral coefficient K was obtained from the spectrum measured simultaneously. Graphs of a maximum power Pmax, photoelectric conversion efficiency η, open-circuit voltage Voc, short-circuit current Isc, and fill factor FF were formed by plotting the spectral coefficient K along the abscissa, and values when K=1 were interpolated from the graphs, thereby obtaining values shown in FIG. 12. In this way, the output characteristics in the standard test conditions could be measured. The above-described value σ(Kn1) was "0". Accurate measurement results could easily be obtained by the measuring method of the present invention.

EXAMPLE 3

In Example 3, as stacked photoelectric conversion devices (sample cells) as objects to be measured, 10 a-Si/μc-Si double solar cells each having a structure, in which a pin junction (to be referred to as an a-Si cell hereinafter) using amorphous silicon for an i-layer and a pin junction (to be referred to as a μc-Si cell hereinafter) using crystallite silicon for an i-layer were stacked in this order from the light incident side, were measured by the method of the present invention using a known steady light solar simulator using a xenon lamp as a light source. The 10 sample cells were numbered #3-1 to #3-10.

The a-Si/μc-Si double solar cell was a cell which had a size of 15 cm×15 cm formed on a single stainless steel substrate and was in a single unit state before the cells were connected in series or in parallel. The solar simulator had an effective irradiation area of 15 cm×15 cm. The time variation rate in irradiance was ±1% or less, and the positional variation in irradiance was ±2% or less. This compares with evaluation rank A of known solar simulators. The evaluation ranks of solar simulators are described in, e.g., JIS C 8912. Three small samples were prepared in the same lot as that of the solar cells, and their spectral responses were measured, as in Example 1. The current-limiting cells of two small samples were the a-Si cells, and the current-limiting cell of the remaining small sample was the μc-Si cell. Hence, the current-limiting cells of the two double solar cells can be either a-Si cells or μc-Si cells.

As a reference cell, a cell having a spectral response approximate to the sum of spectral responses of the a-Si cell and μc-Si cell was prepared. That is, a combination of HA50 and L39 filters available from HOYA K.K. was used on the light incident side of a crystal silicon solar cell. The Japan Quality Assurance Organization (JQA) was requested to calibrate the reference cell as a reference solar cell in advance, and the value (calibration value) of a short-circuit current Isc in the standard test conditions was obtained as 15.9 mA. This reference cell was used as an irradiance detector, and the irradiance of the solar simulator was adjusted to 1,000 W/m² such that the short-circuit current Isc of the reference cell matches the short-circuit current Isc in the standard test conditions. When the irradiance of the solar simulator is adjusted using the reference cell having such a spectral response, a light amount close to the standard sunlight is obtained on the average across the wavelength region where the a-Si/μc-Si double solar cell has a spectral response. Hence, even when the current-limiting cell of a sample is unknown, as in this example, the short-circuit current Isc close to the standard sunlight can be obtained on the average.

As the above-described index cells, the following cells were used. For the index cell (index cell 1) for the a-Si cell, a combination of filters, C-50S available from Toshiba Glass K.K. and L39 available from HOYA K.K., was used on the light incident side of a crystal silicon solar cell. For the index cell (index cell 2) for the μc-Si cell, a combination of filters, A-73A available from Toshiba Glass K.K. and HA50 available from HOYA K.K., was used on the light incident side of a crystal silicon solar cell. The Japan Quality Assurance Organization (JQA) was requested to calibrate each index cell as a reference solar cell in advance, and the value (calibration value) of the short-circuit current Isc in the standard test conditions was obtained. The calibration values were 6.3 mA for index cell 1 and 5.3 mA for index cell 2.

The current vs. voltage characteristic of the double solar cell was measured using the same devices as in Example 1 as the power supply for changing the voltage, voltage detector, and current detector. The temperature of each sample cell was controlled to 25° C.±5° C. using a blower in a room temperature-controlled to 25° C.±2° C. The temperature was measured using a radiation thermometer, and temperature correction for the current vs. voltage characteristic was executed. As the temperature coefficient, a value obtained by a known method using the small sample was used. From the current vs. voltage characteristic after temperature correction, the values of output characteristics, i.e., photoelectric conversion efficiency η, open-circuit voltage Voc, short-circuit current Isc, and fill factor FF were obtained.

A ratio Cn of the short-circuit current Isc to the calibration value of the reference cell under the solar simulator was obtained using equation (5), and a spectral coefficient K of irradiation light by the solar simulator was calculated as K=1.04 using equation (10). At this time, the accumulated lighting time of the xenon lamp was 400 hrs. Next, the xenon lamp was exchanged with a new lamp, the current vs. voltage characteristics of the 10 sample cells were measured again, and the values of output characteristics were obtained. The spectral coefficient was calculated using the index cell as K=1.01. In addition, the elliptical mirror of the solar simulator was exchanged with a new mirror, the current vs. voltage characteristics were measured again, and the values of output characteristics were obtained. The spectral coefficient was calculated using the index cell as K=0.95.

With the above process, the values of the output characteristics of the sample cells in the three spectral states were obtained. As in Example 1, graphs of the spectral coefficient K and the photoelectric conversion efficiency η, open-circuit voltage Voc, short-circuit current Isc, and fill factor FF were formed for each sample cell, and each characteristic value when K=1 was obtained by interpolation. FIG. 13 shows the results. The photoelectric conversion efficiency η was calculated using the area (210 cm²) of the light incident portion of the sample cell.

In this way, the output characteristics of the 10 double solar cells in the standard test conditions could be measured. From the above results, the spectrum dependence of the output characteristics of each sample cell when an optical component such as the lamp or mirror of the solar simulator was exchanged could be quantified. Hence, in measuring a stacked photoelectric conversion device of the same type as described above, if an optical component must be exchanged for periodical maintenance of the solar simulator, the change in output characteristics of the sample cell can be predicted by obtaining the spectral coefficient K by the above-described method. In addition, when a number of stacked photoelectric conversion devices of the same type as described above are to be measured, a variation in output characteristics, which is caused by a variation in spectrum due to the maintenance of the solar simulator or the like, can be corrected, and the evaluation level can be averaged for a long term. Furthermore, as is apparent from the spectrum dependence obtained by the above-described process, for a stacked photoelectric conversion device of the same type as described above, which is supposed to have the same spectrum dependence as described above, the output characteristic measurement results can be corrected to those in the standard test conditions only by obtaining the spectral coefficient K at the time of measurement without making a plurality of spectral states.

EXAMPLE 4

In Example 4, a triple solar cell identical to that of Example 1 was formed on a single stainless steel substrate having a size of about 24 cm×35 cm to prepare a submodule. Five submodules were connected in series using a zinc-plated steel sheet as a support, and a surface protective layer, bypass diode, junction box, and the like were added to form a roofing-material-shaped module having a size of 140 cm×42 cm. Twenty modules were connected in series to form a string, and five strings were connected in parallel to form a solar cell array with an output of 3.2 kW, which was used as a sample to be measured. The solar cell array also functions as a roofing material and is installed as the roof of a building and connected to a power conditioner such as an inverter through a connection box so as to function as a photovoltaic power generation system.

The output characteristics of the solar cell array that was kept installed on the roof were measured by sunlight. Measurement was executed in a plurality of spectral states on fine days when the angle of incidence of direct sunlight was 10° or less (the angle of light that became perpendicularly incident on the solar cell light-receiving surface was defined as 0°) and the irradiance was 800 W/m$^2$ or more. Since the measurement of this example was executed not under the limited meteorological conditions for the standard sunlight method but under more general conditions, the spectrum of sunlight did not satisfy the conditions of standard sunlight.

After the solar cell array was disconnected from the power conditioner in the connection box, the output from the solar cell array was connected to a power supply for changing the voltage. As the power supply, a known method of discharging charges accumulated in a capacitor was used to sweep the voltage. As voltage and current detectors, a known digital multi-meter was used, and the data of the measured voltage and current were input to a notebook-type personal computer. With the above arrangement, the current vs. voltage characteristic of the solar cell array to be measured was obtained.

For the measured current vs. voltage characteristic of the solar cell array, temperature correction and irradiance correction were executed using values obtained by area-converting the value of the temperature correction coefficient and the value of a series resistance Rs, which had been obtained using a triple solar cell having the same structure as described above. In addition, the degree of dirt on the solar cell array was estimated, and the current vs. voltage characteristic was corrected using a dirt correction coefficient. The temperature of the solar cell array was obtained by weighted-averaging temperatures measured at a plurality of points by a radiation thermometer from the array surface side at an estimated angle that generated no shadow on the array. A radiation coefficient $\epsilon$ was obtained by comparing the temperature by a radiation thermometer with a temperature measured by a sheet-type thermocouple of copper constantan and a digital thermometer, which were bonded to the almost central portion of the lower surface of the submodule.

The representative spectral response of the solar cell module of the solar cell array was obtained by measuring the spectral response of a small sample, as in Example 1. However, since the number of solar cell modules of the solar cell array was large, and cells in different lots were also included, modules with different current-limiting cells mixed, and the current-limiting cell of the entire solar cell array was unknown.

Therefore, as a reference cell, a cell having a spectral response approximate to the sum of spectral responses of the top, middle, and bottom cells of the triple solar cell was used. More specifically, a combination of HA50 and L39 filters available from HOYA K.K. was used on the light incident side of a crystal silicon solar cell, as in Example 3.

As a sub-reference cell, a triple solar cell having a small area of 1 cm×1 cm and formed from the same material as that of the triple solar cell module was prepared, which had been irradiated with light for 1,000 hrs and stabilized. Measurement of the spectral response of this sub-reference cell revealed that the current-limiting cell is the top cell. A value obtained by measuring the short-circuit current Isc of the sub-reference cell in the standard test conditions using a solar simulator whose irradiance was adjusted to 1,000 W/m$^2$ in accordance with the calibration value of reference cell 1 of Example 1 was used as a sub-reference calibration value. As index cells, cells identical to reference cells 1, 2, and 3 of Example 1 were used as index cells 1, 2, and 3 for the top, middle, and bottom cells. The reference cell was used as an irradiance detector, and the short-circuit current Isc of the reference cell was compared with the calibration value, thereby measuring the irradiance.

Simultaneously, an irradiance was measured using the reference calibration value of the sub-reference cell as reference irradiance 1. An irradiance was measured by index cell 1 as reference irradiance 2. The ratio of reference irradiance 1 to reference irradiance 2 was obtained. A plurality of spectral states in which a variation in this ratio was 3% or less as a relative value were selected, and the output characteristics of the solar cell array were measured. The current-limiting cell (top cell) of the sub-reference cell and index cell 1 had approximate spectral responses though the materials were different. With the above process, an error due to the difference in material such as the difference in absorption of diffused light was removed, thereby more accurately measuring the output characteristics of the solar cell array.

The reference cell, sub-reference cell, and index cells were set at the same angle with respect to sunlight as the solar cell array as a sample to equalize the incident angles of direct sun light, and the short-circuit currents Isc were measured simultaneously with measurement of the output characteristics of the solar cell array, thereby equalizing the measurement conditions. The temperatures of the reference cell, sub-reference cell, and index cells were adjusted to 25° C.±2° C. by Peltier elements.

As in Example 3, a ratio Cn of the short-circuit current Isc to the calibration value of the index cell under the sunlight was obtained using equation (5), and a spectral coefficient K of sunlight in the plurality of spectral states was calculated by the above-described method using equation (10). With the above process, the spectral coefficients K and the values of the output characteristics of the solar cell array in the plurality of spectral states were obtained. As in Example 1, graphs of the spectral coefficient K and a maximum power Pmax, photoelectric conversion efficiency η, open-circuit voltage Voc, short-circuit current Isc, and fill factor FF were formed for each sample cell, and each characteristic value when K=1 was obtained by interpolation. FIG. 14 shows the results.

In this way, the output characteristics of the solar cell array in the standard test conditions could be measured. According to the measuring method of the present invention, when the results obtained by outdoor measurement are corrected, accurate measurement results can be obtained without waiting for a day when the standard sunlight conditions are obtained under strict meteorological conditions.

EXAMPLE 5

In Example 5, five stacked photosensors each having a structure in which a pn junction by AlGaAs and a pn junction by GaAs were stacked in this order from the light incident side were used as samples to be measured, and their output characteristics measured by a known solar simulator using a metal halide lamp as a light source. The five samples were numbered #5-1 to #5-5. Each photosensor was formed on a single GaAs wafer and then cut into a size of 1 cm×1 cm and was in a state before a sensor unit was formed. The solar simulator had an effective irradiation area of 10 cm×10 cm. The time variation ratio of the irradiance was ±1% or less, and the positional variation in irradiance was ±2% or less.

A number of stacked photosensors having the same structure and size (1 cm×1 cm) as described above were prepared, and a photosensor having average output characteristics and average spectral response was selected therefrom as a reference cell. A short-circuit current Isc of the reference cell in the standard test conditions was measured in advance by the multi-source method using the above-described solar simulator with a variable spectrum. The spectral response was measured by a known method. As an irradiance detector, the reference cell was used, and the irradiance of the solar simulator was adjusted to 1,000 W/m$^2$ such that the short-circuit current Isc of the reference cell matched that in the standard test conditions. For each of the sample and reference cell, a copper block and Peltier element were arranged on the lower surface of the substrate to adjust the cell temperature to 25° C.±1° C.

As a power supply for changing the voltage, a known electronic load was used. The voltage was swept by a personal computer. As voltage and current detectors, a resistor and AD conversion card were used, and the data of the measured voltage and current were input to the personal computer. At this time, when the set voltage of the electronic load was changed, a complete signal was output to externally trigger the AD conversion card. Then, a delay time was set in consideration of the rise time of set voltage and the capacitance of the sample cell, thereby measuring the voltage and current at the same timing. With the above process, the current vs. voltage characteristics of the five samples to be measured were obtained. In addition, the value of the output characteristics, i.e., a photoelectric conversion efficiency η, open-circuit voltage Voc, short-circuit current Isc, and fill factor FF were calculated from the current vs. voltage characteristics.

The spectrum of the solar simulator was measured using a known spectro-radiometer. The product of the measured spectrum and the above-described spectral response was integrated in accordance with equation (2) described above, and a spectral coefficient K was obtained from each resultant value In as K=1.07. At this time, the accumulated lighting time of the metal halide lamp was 1,100 hrs.

Next, the metal halide lamp of the solar simulator was exchanged with a new lamp to change the spectrum, and measurement of the current vs. voltage characteristics of the five samples and measurement of the spectrum of the solar simulator were executed again. The spectral coefficient K was obtained again from the product of the spectrum measurement result and spectral response using equation (10) as K=1.02. With the above process, the values of the output characteristics of the five samples in the two spectral states were obtained.

As in Example 1, graphs of the spectral coefficient K and the photoelectric conversion efficiency η, open-circuit voltage Voc, short-circuit current Isc, and fill factor FF were formed for each sample cell, and each characteristic value when K=1 was obtained by extrapolation. FIG. 15 shows the results.

In this way, the output characteristics of the five stacked photosensors in the standard test conditions could be obtained.

As has been described above, an output characteristic measuring method capable of measuring even a large-area device such as a module or array independently of the area of a stacked photoelectric conversion device to be measured either indoors or outdoors and accurately measuring the output characteristics of the stacked photoelectric conversion device using an inexpensive measuring system, and a method of quantifying the spectrum dependence of output characteristics, an output characteristic prediction method, and an output characteristic measuring apparatus using the output characteristic measuring method can be implemented.

That is, when the output characteristics of the stacked photoelectric conversion device and the shift of the short-circuit current Isc of a component cell from the standard test condition are compared, the correlation between them can be obtained, and thus, a state wherein the short-circuit current Isc of the component cell has no shift from the standard test condition, i.e., the output characteristics of the stacked photoelectric conversion device in the standard test conditions can be obtained. Hence, accurate output characteristics of the stacked photoelectric conversion device can be obtained, the yield in stacked photoelectric conversion device manufacturing process can be improved, and products with guaranteed output can be provided. In addition, since a change in spectrum of irradiation light can be represented by an index using a single parameter in accordance with a change in shift of the short-circuit current Isc of the component cell from the standard test condition, the spectrum dependence of the output characteristics of the stacked photoelectric conversion device can easily be quantified.

From a change in shift of the short-circuit current Isc of the component cell from the standard test conditions when the spectrum changes, the output characteristics of the stacked photoelectric conversion device in an arbitrary spectral state can be predicted. By quantification and prediction of the spectrum dependence, when the irradiation light is pseudo sunlight, a change in measurement value when the spectrum changes due to a change or exchange of an optical component of the pseudo sunlight irradiation system (solar simulator) can be obtained, and the change in measurement value can be corrected. Furthermore, the output characteristics of the stacked photoelectric conversion device under sunlight in an arbitrary region, season, and time can be accurately predicted.

Measurement can be executed at low cost while maintaining the accuracy of output characteristic results without using any expensive measuring system. The output characteristics of a stacked photoelectric conversion device with an arbitrary area, such as a cell, module, or array, can be accurately measured independently of the area of the stacked photoelectric conversion device. Unlike the multi-source method, complex control is unnecessary. Unlike the standard sunlight method, strict measurement conditions need not be selected. Hence, the measuring method can be facilitated and the measurement opportunities can be increased while maintaining the accuracy of output characteristic results.

Of the semiconductor junctions of a stacked photoelectric conversion device, a semiconductor junction which limits the short-circuit current Isc of the stacked photoelectric conversion device in light irradiation is defined as a current-limiting cell, and the irradiance is measured by a photoelectric conversion device (reference cell) having a spectral response approximate to that of the current-limiting cell. With this arrangement, the irradiance can be more accurately measured, and the output characteristics of the stacked photoelectric conversion device can be more accurately measured. Since the reference cell can be a photoelectric conversion device (single cell) having a single junction, the calibration value can be measured by a public agency such as the Japan Quality Assurance Organization (JQA), and the traceability of the output characteristic measurement of the stacked photoelectric conversion device can be established. The spectrum of irradiation light is measured by a spectrometer. The spectral response of the stacked photoelectric conversion device is measured by a spectral response measuring device. The product of the spectral intensity of the irradiation light and the spectral response of the stacked photoelectric conversion device is integrated across a wavelength range for "spectral response>0", thereby obtaining the short-circuit current Isc of the component cell. With this arrangement, a shift of the short-circuit current Isc of each component cell from the standard test condition can be more accurately estimated whereby the output characteristics of the stacked photoelectric conversion device or a change in output characteristics due to the spectrum can be more accurately predicted.

An index cell which approximates the spectral response of each component cell of the stacked photoelectric conversion device is prepared, and the short-circuit current Isc of each component cell is estimated by the short-circuit current Isc of the index cell under irradiation light. With this arrangement, since a shift of the short-circuit current Isc of the component cell from the standard test condition can be estimated without measuring the irradiation light spectrum itself, the measuring system can be simplified, and accurate measurement can easily be done at an arbitrary place.

A plurality of spectral states are realized by using pseudo sunlight as irradiation light and changing or exchanging some components of the optical system for generating the pseudo sunlight, and the output characteristics of the stacked photoelectric conversion device can be easily and stably measured at low cost without using any expensive solar simulator, unlike the multi-source method or supplementary light source method. When a plurality of spectral states are realized by using sunlight as irradiation light and changing the season, time, or place for measurement, the irradiance of sunlight on the irradiation surface rarely varies positionally, and the output characteristics of the stacked photoelectric conversion device can be more accurately measured. In addition, the output characteristics can be accurately measured in an arbitrary region independently of the area of the stacked photoelectric conversion device and the device type such as a cell, module, or array.

As many apparently widely different embodiments of the present invention can be made without departing from the-spirit and scope thereof, it is to be understood that the invention is not limited to the specific embodiments thereof except as defined in the appended claims.

What is claimed is:

1. A method of measuring photoelectric conversion characteristics of a stacked photoelectric conversion device having a structure in which a plurality of semiconductor junctions are stacked, comprising the steps of:

measuring output characteristics of the photoelectric conversion device under irradiation light having a plurality of different spectral states;

estimating a shift, from a standard test condition, of a short-circuit current of a component cell formed by each of the plurality of semiconductor junctions of the photoelectric conversion device; and obtaining the photoelectric conversion characteristics of the photoelectric conversion device in the standard test condition by comparing the measured photoelectric conversion characteristics with the estimated shift of the short-circuit current from the standard test condition.

2. The method according to claim 1, wherein to measure the photoelectric conversion characteristics, a voltage and current of the photoelectric conversion device are measured while changing the voltage of the photoelectric conversion device in light irradiation.

3. The method according to claim 1, wherein the measuring step comprises the steps of:

detecting an irradiance of the irradiation light; and correcting measurement results of the photoelectric conversion characteristics on the basis of the detected irradiance.

4. The method according to claim 3, wherein the irradiance of the irradiation light is measured using a photoelectric conversion cell having a spectral response approximate to that of a component cell that limits the short-circuit current of the photoelectric conversion device in the standard test condition.

5. The method according to claim 1, wherein the estimation step comprises the steps of:

measuring a spectral intensity of the irradiation light;

measuring a spectral response of the photoelectric conversion device; and estimating the shift by comparing a short-circuit current obtained by integrating a product of the measured spectral intensity and spectral response across a wavelength range where the value of spectral response is positive with the short-circuit current in the standard test condition.

6. The method according to claim 1, wherein the estimation step comprises the steps of:

measuring a short-circuit current of an index cell, which is a photoelectric conversion cell, having a spectral response approximate to that of the component cell of the photoelectric conversion device under the irradiation light; and estimating the shift by comparing the short-circuit current of the index cell with the short-circuit current of the index cell in the standard test condition.

7. The method according to claim 1, wherein the plurality of different spectral states are realized by using pseudo sunlight as the irradiation light and changing or exchanging some components of an optical system for irradiation.

8. The method according to claim 1, wherein the plurality of different spectral states are realized by using sunlight as the irradiation light and changing a season, time, or place for measurement.

9. A method of quantifying spectrum dependence by using the method of claim 1, comprising the step of representing a change in spectrum of the irradiation light as an index on the basis of a change in shift of the short-circuit current of the component cell from the standard test condition and quantifying the spectrum dependence of the photoelectric conversion characteristics of the photoelectric conversion device.

10. A method of predicting photoelectric conversion characteristics of a photoelectric conversion device by using the method of claim 1, comprising the step of predicting the photoelectric conversion characteristics of the photoelectric conversion device in an arbitrary spectral state on the basis of a change in shift of the short-circuit current of the component cell from the standard test condition.

11. A measuring apparatus for measuring photoelectric conversion characteristics of a stacked photoelectric conversion device having a structure in which a plurality of semiconductor junctions are stacked, comprising:

a measuring unit, arranged to measure output characteristics of the photoelectric conversion device under irradiation light having a plurality of different spectral states;

an estimating unit, arranged to estimate a shift, from a standard test condition, of a short-circuit current of a component cell formed by each of the plurality of semiconductor junctions of the photoelectric conversion device; and an obtaining unit, arranged to obtain the photoelectric conversion characteristics of the photoelectric conversion device in the standard test condition by comparing the measured photoelectric conversion characteristics with the estimated shift of the short-circuit current from the standard test condition.

12. The apparatus according to claim 11, wherein said measuring unit comprises:

a voltage controller, arranged to change a voltage of the photoelectric conversion device in light irradiation; and a voltage and current detector, arranged to measure the voltage and current of the photoelectric conversion device.

13. The apparatus according to claim 11, further comprising an irradiance detector, arranged to detect an irradiance of the irradiation light, wherein said obtaining unit corrects measurement results of the photoelectric conversion characteristics on the basis of the detected irradiance.

14. The apparatus according to claim 13, wherein said irradiance detector measures, the irradiance of the irradiation light using a photoelectric conversion cell having a spectral response approximate to that of a component cell that limits the short-circuit current of the photoelectric conversion device in the standard test condition.

15. The apparatus according to claim 11, wherein said estimating unit comprises a spectrum detector, arranged to measure a spectral intensity of the irradiation light, and a measuring device, arranged to measure a spectral response of the photoelectric conversion device, wherein said estimating unit estimates the shift by comparing a short-circuit current obtained by integrating a product of the measured spectral intensity and spectral response across a wavelength range where the value of spectral response is positive with the short-circuit current in the standard test condition.

16. The apparatus according to claim 11, wherein said estimating unit comprises a current detector, arranged to measure a short-circuit current of a photoelectric conversion cell having a spectral response approximate to that of the component cell of the photoelectric conversion device under the irradiation light, wherein said estimating unit estimates the shift by comparing the short-circuit current of the index cell with the short-circuit current of the index cell in the standard test condition.

17. The apparatus according to claim 11, further comprising a pseudo sunlight unit for irradiating the irradiation light, wherein the plurality of different spectral states are realized by changing or exchanging some components of an optical system of said pseudo sunlight unit.

18. The apparatus according to claim 11, wherein the plurality of different spectral states are realized by using sunlight as the irradiation light and changing a season, time, or place for measurement.

19. A method of quantifying spectrum dependence by using the apparatus of claim 11, comprising the step of representing a change in spectrum of the irradiation light as an index on the basis of a change in shift of the short-circuit current of the component cell from the standard test condition and quantifying the spectrum dependence of the photoelectric conversion characteristics of the photoelectric conversion device.

20. A method of predicting photoelectric conversion characteristics of a photoelectric conversion device by using the apparatus of claim 11, comprising the step of predicting the photoelectric conversion characteristics of the photoelectric conversion device in an arbitrary spectral state on the basis of a change in shift of the short-circuit current of the component cell from the standard test condition.

21. A computer program product comprising a computer readable medium storing a computer program code, for a method of measuring photoelectric conversion characteristics of a stacked photoelectric conversion device having a structure in which a plurality of semiconductor junctions are stacked, comprising the process procedure code for:

measuring output characteristics of the photoelectric conversion device under irradiation light having a plurality of different spectral states;

estimating a shift, from a standard test condition, of a short-circuit current of a component cell formed by each of the plurality of semiconductor junctions of the photoelectric conversion device; and obtaining the photoelectric conversion characteristics of the photoelectric conversion device in the standard test condition by comparing the measured photoelectric conversion characteristics with the estimated shift of the short-circuit current from the standard test condition.

* * * * *